United States Patent
Padmanabhan

(10) Patent No.: US 11,880,349 B2
(45) Date of Patent: Jan. 23, 2024

(54) SYSTEM OR METHOD TO QUERY OR SEARCH A METADATA DRIVEN DISTRIBUTED LEDGER OR BLOCKCHAIN

(71) Applicant: Salesforce, Inc., San Francisco, CA (US)

(72) Inventor: Prithvi Krishnan Padmanabhan, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/526,925

(22) Filed: Jul. 30, 2019

(65) Prior Publication Data

US 2020/0349142 A1 Nov. 5, 2020

Related U.S. Application Data

(60) Provisional application No. 62/841,143, filed on Apr. 30, 2019.

(51) Int. Cl.
| | |
|---|---|
| *G06F 16/23* | (2019.01) |
| *G06F 16/2458* | (2019.01) |
| *G06F 16/27* | (2019.01) |
| *H04L 9/06* | (2006.01) |

(52) U.S. Cl.
CPC ...... *G06F 16/2308* (2019.01); *G06F 16/2365* (2019.01); *G06F 16/2471* (2019.01); *G06F 16/27* (2019.01); *H04L 9/0637* (2013.01)

(58) Field of Classification Search
CPC .. G06F 16/2308; G06F 16/2471; G06F 16/27; G06F 16/2365; H04L 9/0637
See application file for complete search history.

(56) References Cited

U.S. PATENT DOCUMENTS

| | | | |
|---|---|---|---|
| 5,634,053 A | 5/1997 | Noble et al. | |
| 6,333,929 B1 | 12/2001 | Drottar et al. | |
| 7,587,348 B2 | 9/2009 | Liao et al. | |
| 8,095,463 B1 | 1/2012 | Hartmaier | |
| 9,027,094 B1 | 5/2015 | Balazs et al. | |
| 9,569,700 B1 | 2/2017 | Santos et al. | |
| 9,690,822 B2 | 6/2017 | Roy-Faderman | |
| 9,978,067 B1 | 5/2018 | Sadaghiani et al. | |

(Continued)

FOREIGN PATENT DOCUMENTS

| | | |
|---|---|---|
| CN | 108021986 A | 5/2018 |
| CN | 109173261 A | 1/2019 |

(Continued)

OTHER PUBLICATIONS

"Deloitte IoT Powered by Blockchain", dated May 2017, 20 pages.

(Continued)

*Primary Examiner* — Hung T Vy
(74) *Attorney, Agent, or Firm* — Nicholson, De Vos, Webster & Elliott, LLP

(57) ABSTRACT

A method implemented by a computer system including receiving a transaction for a blockchain to update a data record persistently stored on the blockchain, the transaction specifying updated values for one or more of a plurality of data elements of the data record, and updating correlated data records separate from the blockchain in a database system to match the updated values for the data record in the blockchain.

20 Claims, 9 Drawing Sheets

(56) References Cited

U.S. PATENT DOCUMENTS

| | | |
|---|---|---|
| 10,042,636 B1 | 8/2018 | Srivastava et al. |
| 10,102,265 B1 | 10/2018 | Madisetti et al. |
| 10,311,230 B2 | 6/2019 | Jagadeesan et al. |
| 10,373,129 B1 | 8/2019 | James et al. |
| 10,425,399 B2 | 9/2019 | Kravitz et al. |
| 10,482,466 B1 | 11/2019 | Walters et al. |
| 10,505,726 B1 | 12/2019 | Andon et al. |
| 10,521,196 B1 | 12/2019 | Wang et al. |
| 10,521,780 B1 | 12/2019 | Hopkins et al. |
| 10,541,821 B2 | 1/2020 | Toll et al. |
| 10,585,657 B2 | 3/2020 | Padmanabhan |
| 10,637,644 B1 | 4/2020 | Walters et al. |
| 10,701,054 B2 | 6/2020 | Padmanabhan et al. |
| 10,728,283 B1 | 7/2020 | Dobrek et al. |
| 10,762,506 B1 | 9/2020 | Cash et al. |
| 10,885,567 B2 | 1/2021 | Bhattacherjee et al. |
| 10,929,866 B1 | 2/2021 | Qi et al. |
| 11,038,771 B2 | 6/2021 | Padmanabhan |
| 11,184,394 B1 | 11/2021 | Dobrek et al. |
| 2005/0102159 A1 | 5/2005 | Mondshine |
| 2006/0118611 A1 | 6/2006 | Michelsen et al. |
| 2006/0259361 A1 | 11/2006 | Barhydt et al. |
| 2008/0066165 A1 | 3/2008 | Rosenoer |
| 2009/0037949 A1 | 2/2009 | Birch |
| 2011/0289140 A1 | 11/2011 | Pletter et al. |
| 2013/0041934 A1 | 2/2013 | Annamalaisami et al. |
| 2013/0226682 A1 | 8/2013 | Grossman |
| 2013/0346173 A1 | 12/2013 | Chandoor |
| 2014/0039990 A1 | 2/2014 | Ken |
| 2014/0278894 A1 | 9/2014 | Toumayan et al. |
| 2015/0026061 A1 | 1/2015 | Siegel et al. |
| 2016/0027229 A1 | 1/2016 | Spanos et al. |
| 2016/0042383 A1 | 2/2016 | Joshi et al. |
| 2016/0092872 A1 | 3/2016 | Prakash et al. |
| 2016/0148251 A1 | 5/2016 | Thomas et al. |
| 2016/0350860 A1 | 12/2016 | Dintenfass et al. |
| 2016/0358267 A1 | 12/2016 | Arjomand et al. |
| 2016/0364743 A1 | 12/2016 | St et al. |
| 2017/0005804 A1 | 1/2017 | Zinder |
| 2017/0046698 A1 | 2/2017 | Haldenby et al. |
| 2017/0085545 A1 | 3/2017 | Lohe et al. |
| 2017/0103167 A1 | 4/2017 | Shah |
| 2017/0103472 A1 | 4/2017 | Shah |
| 2017/0132625 A1 | 5/2017 | Kennedy |
| 2017/0132630 A1 | 5/2017 | Castinado et al. |
| 2017/0140145 A1 | 5/2017 | Shah |
| 2017/0153872 A1 | 6/2017 | Le et al. |
| 2017/0163547 A1 | 6/2017 | Xiong et al. |
| 2017/0200157 A1 | 7/2017 | Bergeon et al. |
| 2017/0206603 A1 | 7/2017 | Al-Masoud |
| 2017/0236215 A1 | 8/2017 | Eisen et al. |
| 2017/0289111 A1 | 10/2017 | Voell et al. |
| 2017/0295021 A1 | 10/2017 | Aranda et al. |
| 2017/0295023 A1 | 10/2017 | Madhavan et al. |
| 2017/0300627 A1 | 10/2017 | Giordano et al. |
| 2017/0300872 A1 | 10/2017 | Brown et al. |
| 2017/0300876 A1 | 10/2017 | Musiala et al. |
| 2017/0337534 A1 | 11/2017 | Goeringer et al. |
| 2017/0344988 A1 | 11/2017 | Cusden et al. |
| 2017/0348286 A1 | 12/2017 | Williams et al. |
| 2017/0353309 A1 | 12/2017 | Gray |
| 2017/0364549 A1 | 12/2017 | Abalos |
| 2017/0364699 A1 | 12/2017 | Goldfarb et al. |
| 2017/0372300 A1 | 12/2017 | Dunlevy et al. |
| 2018/0005186 A1 | 1/2018 | Hunn |
| 2018/0006831 A1 | 1/2018 | Toll et al. |
| 2018/0019879 A1 | 1/2018 | Kravitz et al. |
| 2018/0026505 A1 | 1/2018 | Galmiche et al. |
| 2018/0041345 A1 | 2/2018 | Maim |
| 2018/0082256 A1 | 3/2018 | Tummuru et al. |
| 2018/0088928 A1 | 3/2018 | Smith et al. |
| 2018/0123779 A1 | 5/2018 | Zhang |
| 2018/0139186 A1 | 5/2018 | Castagna |
| 2018/0144042 A1 | 5/2018 | Sheng et al. |
| 2018/0158162 A1 | 6/2018 | Ramasamy |
| 2018/0165416 A1 | 6/2018 | Saxena et al. |
| 2018/0189100 A1 | 7/2018 | Nemoto et al. |
| 2018/0191503 A1 | 7/2018 | Alwar et al. |
| 2018/0204213 A1 | 7/2018 | Zappier et al. |
| 2018/0218176 A1 | 8/2018 | Voorhees et al. |
| 2018/0225611 A1 | 8/2018 | Daniel et al. |
| 2018/0232644 A1 | 8/2018 | Acharya et al. |
| 2018/0232659 A1 | 8/2018 | Ranatunga et al. |
| 2018/0239897 A1 | 8/2018 | Ventura |
| 2018/0247191 A1 | 8/2018 | Katz et al. |
| 2018/0253661 A1 | 9/2018 | Strauss |
| 2018/0260212 A1 | 9/2018 | Wisnovsky |
| 2018/0262505 A1 | 9/2018 | Ligatti |
| 2018/0268401 A1 | 9/2018 | Ortiz et al. |
| 2018/0268506 A1 | 9/2018 | Wodetzki et al. |
| 2018/0276553 A1 | 9/2018 | Redkar et al. |
| 2018/0276626 A1 | 9/2018 | Laiben |
| 2018/0300382 A1 | 10/2018 | Madisetti et al. |
| 2018/0307990 A1 | 10/2018 | Chawla et al. |
| 2018/0365686 A1 | 12/2018 | Kondo |
| 2018/0367528 A1 | 12/2018 | Schwarz et al. |
| 2018/0373776 A1 | 12/2018 | Madisetti et al. |
| 2019/0012249 A1 | 1/2019 | Mercuri et al. |
| 2019/0012595 A1 | 1/2019 | Beser et al. |
| 2019/0013933 A1* | 1/2019 | Mercuri ............... G06Q 20/405 |
| 2019/0019090 A1 | 1/2019 | Chacko et al. |
| 2019/0028276 A1 | 1/2019 | Pierce et al. |
| 2019/0034404 A1 | 1/2019 | Anderson et al. |
| 2019/0035018 A1 | 1/2019 | Nolan et al. |
| 2019/0050855 A1 | 2/2019 | Martino et al. |
| 2019/0052454 A1 | 2/2019 | Wright et al. |
| 2019/0058709 A1 | 2/2019 | Kempf et al. |
| 2019/0081796 A1 | 3/2019 | Chow et al. |
| 2019/0086988 A1 | 3/2019 | He et al. |
| 2019/0087598 A1 | 3/2019 | Adkins et al. |
| 2019/0087892 A1 | 3/2019 | Pinski et al. |
| 2019/0102409 A1 | 4/2019 | Shi et al. |
| 2019/0102423 A1 | 4/2019 | Little et al. |
| 2019/0108543 A1 | 4/2019 | Chan et al. |
| 2019/0109702 A1 | 4/2019 | Maggu et al. |
| 2019/0109713 A1 | 4/2019 | Clark et al. |
| 2019/0120929 A1* | 4/2019 | Meadow ............... G01S 5/0036 |
| 2019/0122186 A1 | 4/2019 | Kano et al. |
| 2019/0147532 A1 | 5/2019 | Singh et al. |
| 2019/0149325 A1 | 5/2019 | Garagiola et al. |
| 2019/0149334 A1 | 5/2019 | Van Der Velden |
| 2019/0158270 A1 | 5/2019 | Berti |
| 2019/0164156 A1 | 5/2019 | Lindemann |
| 2019/0164220 A1 | 5/2019 | Raj et al. |
| 2019/0172282 A1 | 6/2019 | Patel |
| 2019/0182047 A1 | 6/2019 | Andreina et al. |
| 2019/0188706 A1 | 6/2019 | McCurtis |
| 2019/0206536 A1 | 7/2019 | Hausman |
| 2019/0215149 A1 | 7/2019 | Ramasamy et al. |
| 2019/0228006 A1 | 7/2019 | Tormasov et al. |
| 2019/0236559 A1 | 8/2019 | Padmanabhan |
| 2019/0236562 A1 | 8/2019 | Padmanabhan |
| 2019/0236598 A1 | 8/2019 | Padmanabhan |
| 2019/0236606 A1 | 8/2019 | Padmanabhan et al. |
| 2019/0238316 A1 | 8/2019 | Padmanabhan |
| 2019/0238525 A1 | 8/2019 | Padmanabhan et al. |
| 2019/0251071 A1* | 8/2019 | Shao ................... G06F 16/2358 |
| 2019/0287026 A1 | 9/2019 | Calmon et al. |
| 2019/0287116 A1 | 9/2019 | Karantzis |
| 2019/0295114 A1 | 9/2019 | Pavletic et al. |
| 2019/0303121 A1 | 10/2019 | Padmanabhan |
| 2019/0303445 A1 | 10/2019 | Padmanabhan |
| 2019/0303579 A1 | 10/2019 | Reddy et al. |
| 2019/0306235 A1 | 10/2019 | Veale et al. |
| 2019/0334716 A1 | 10/2019 | Kocsis et al. |
| 2019/0370634 A1 | 12/2019 | Ferreira et al. |
| 2019/0370866 A1 | 12/2019 | Lawbaugh et al. |
| 2019/0377806 A1 | 12/2019 | Padmanabhan et al. |
| 2019/0385160 A1 | 12/2019 | Safak et al. |
| 2019/0386834 A1 | 12/2019 | Furukawa |
| 2020/0019616 A1 | 1/2020 | Sukhija et al. |
| 2020/0019923 A1 | 1/2020 | Santhar et al. |
| 2020/0027005 A1 | 1/2020 | Harrison et al. |
| 2020/0027090 A1 | 1/2020 | Braundmeier |

(56) References Cited

U.S. PATENT DOCUMENTS

| | | |
|---|---|---|
| 2020/0042939 A1 | 2/2020 | Padmanabhan |
| 2020/0050613 A1 | 2/2020 | Gauvreau, Jr. |
| 2020/0057860 A1 | 2/2020 | Patil et al. |
| 2020/0074477 A1 | 3/2020 | Lamba et al. |
| 2020/0074515 A1 | 3/2020 | Ghatage et al. |
| 2020/0076574 A1 | 3/2020 | Austin et al. |
| 2020/0089663 A1 | 3/2020 | Padmanabhan |
| 2020/0089670 A1 | 3/2020 | Padmanabhan et al. |
| 2020/0089671 A1 | 3/2020 | Padmanabhan et al. |
| 2020/0089672 A1 | 3/2020 | Velisetti et al. |
| 2020/0089895 A1 | 3/2020 | Gollogly |
| 2020/0104636 A1 | 4/2020 | Halevi et al. |
| 2020/0110812 A1 | 4/2020 | Kamijoh |
| 2020/0112440 A1 | 4/2020 | Nakamura et al. |
| 2020/0117730 A1* | 4/2020 | Vaswani ............... H04L 9/3247 |
| 2020/0118011 A1 | 4/2020 | Kaiser et al. |
| 2020/0119906 A1 | 4/2020 | Das et al. |
| 2020/0133955 A1 | 4/2020 | Padmanabhan et al. |
| 2020/0134656 A1 | 4/2020 | Padmanabhan |
| 2020/0143267 A1 | 5/2020 | Gidney |
| 2020/0169546 A1 | 5/2020 | Padmanabhan |
| 2020/0186338 A1 | 6/2020 | Andon et al. |
| 2020/0234386 A1 | 7/2020 | Blackman et al. |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250661 A1 | 8/2020 | Padmanabhan et al. |
| 2020/0250683 A1 | 8/2020 | Padmanabhan et al. |
| 2020/0250747 A1 | 8/2020 | Padmanabhan |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0287718 A1 | 9/2020 | Hildebrand et al. |
| 2020/0287719 A1 | 9/2020 | Hildebrand et al. |
| 2020/0336475 A1 | 10/2020 | Padmanabhan et al. |
| 2020/0344132 A1 | 10/2020 | Padmanabhan |
| 2020/0349564 A1 | 11/2020 | Padmanabhan et al. |
| 2020/0357084 A1 | 11/2020 | Lerato et al. |
| 2021/0081404 A1 | 3/2021 | Kempf et al. |
| 2021/0152535 A1 | 5/2021 | Padmanabhan et al. |
| 2021/0152536 A1 | 5/2021 | Padmanabhan et al. |
| 2021/0174609 A1 | 6/2021 | Bryant et al. |
| 2021/0182423 A1 | 6/2021 | Padmanabhan |
| 2021/0226774 A1 | 7/2021 | Padmanabhan |
| 2021/0243193 A1 | 8/2021 | Padmanabhan |
| 2022/0006705 A1 | 1/2022 | Padmanabhan |

FOREIGN PATENT DOCUMENTS

| | | |
|---|---|---|
| CN | 111919417 A | 11/2020 |
| EP | 3747153 A1 | 12/2020 |
| JP | 2021-512416 A | 5/2021 |
| WO | 2016/161073 A1 | 10/2016 |
| WO | 2018/007827 A1 | 1/2018 |
| WO | 2018/007828 A2 | 1/2018 |
| WO | 2018/194707 A1 | 10/2018 |
| WO | 2018/230581 A1 | 12/2018 |
| WO | 2019/152750 A1 | 8/2019 |
| WO | 2020/056597 A1 | 3/2020 |

OTHER PUBLICATIONS

"How Creating Digital Twins In Blockchain Will Protect Brands?", dated Nov. 15, 2018, 4 pages.

"How Smart Certificates of Authenticity Improve Asset Management", Jan. 17, 2019, 4 pages.

"Nasdaq, Using Blockchain Track Assets Proof Ownership", dated Nov. 30, 2016, 30 pages.

"Using Sawtooth with Docker: Configuring the List of Transaction Families"; downloaded from URL https://sawtooth.hyperledger.org/docs/core/releases/1.0/app_developers guide/docker.html#configuring-the-list-of-transaction-families on Apr. 6, 2018, 15 pages.

Azaria et al., "MedRec: Using Blockchain for Medical Data Access and Permission Management", 2016 2nd International Conference on Open and Big Data, IEEE, 2016, pp. 25-30.

BigchainDB, "BigchainDB 2.0: The Blockchain Database," whitepaper version 1.0, May 2018, pp. 1-14.

Final Office Action for U.S. Appl. No. 15/885,803, dated Jul. 20, 2020, 29 pages.

Final Office Action for U.S. Appl. No. 15/885,811, dated Aug. 5, 2020, 45 pages.

Final Office Action for U.S. Appl. No. 15/932,092 dated Jun. 22, 2020, 42 pages.

Final Office Action for U.S. Appl. No. 15/932,099 dated Jun. 1, 2020, 26 pages.

Genestier et al., "Blockchain For Consent Management in the eHealth Environment: A Nugget For Privacy And Security Challenges",J. Int Soc. Telemed eHealth, Jan. 1, 2017, pp. 1-4.

International Search Report and Written Opinion for Application No. PCT/US2019/036103, dated Aug. 1, 2019, 12 pages.

International Search Report and Written Opinion for Application No. PCT/US2020/015618 dated May 11, 2020, 13 pages.

International Search Report and Written Opinion, PCT App. No. PCT/US2019/016199, dated Apr. 2, 2019, 11 pages.

McConaghy et al., "BigchainDB: A Scalable Blockchain Database", Whitepaper, Jun. 8, 2016, pp. 1-65.

Notice of Allowance for U.S. Appl. No. 16/264,653 dated Nov. 23, 2020, 16 pages.

Notice of Allowance, U.S. Appl. No. 15/932,100, dated Feb. 20, 2020, 5 pages.

Notice of Allowance, U.S. Appl. No. 15/940,646, dated Oct. 31, 2019, 8 pages.

Office Action for U.S. Appl. No. 15/932,092 dated Jan. 22, 2020, 36 pages.

Office Action for U.S. Appl. No. 16/177,305 dated Jul. 23, 2020, 41 pages.

Office Action for U.S. Appl. No. 16/264,657, dated Sep. 18, 2020, 33 pages.

Office Action for U.S. Appl. No. 16/683,945 dated Sep. 14, 2020, 26 Pages.

Office Action for EP Application No. 19707168.1 dated Sep. 24, 2020, 3 pages.

Office Action, U.S. Appl. No. 15/885,803, dated Jan. 8, 2020, 47 pages.

Office Action, U.S. Appl. No. 15/885,811, dated Jan. 17, 2020, 40 pages.

Office Action, U.S. Appl. No. 15/932,092, dated Jan. 22, 2020, 36 pages.

Office Action, U.S. Appl. No. 15/932,099, dated Oct. 3, 2019, 26 pages.

Office Action, U.S. Appl. No. 15/932,100, dated Nov. 8, 2019, 9 pages.

Office Action, U.S. Appl. No. 15/940,646, dated Apr. 29, 2019, 7 pages.

Ojha, "Chaincode for Go Developers, Part 1: Writing Blockchain Chaincode in Go for Hyperledger Fabric v0.6," 2017, 15 pages.

Peterson, K., et al., "A Blockchain-Based Approach to Health Information Exchange Networks," (Aug. 8, 2016), Retrieved from the Internet: URL: http://kddlab.zjgsu.edu.cn:7200/research/blockchain/huyiyang-reference/A%20Blockchain-Based%20Approach%20to%20Health%20Information%20Exchange.pdf, Retrieved on Mar. 21, 2019), 10 pages.

Salesforce, "Force.com Apex Code Developer's Guide," version 34.0, 2015, 1000 pages.

Sandgaard et al., "MedChain White Paper v1.1", MedChain, Inc., 2018, pp. 1-53.

Wikipedia, "Federate database system," Jun. 8, 2016, https://en.wikipedia.org/w/index.php/?title=Federated%20database%20system&oldid=808166410, 6 pages.

Wikipedia, "Solidity," Feb. 2, 2017, https://web,arcllive.org/web/2017020202304/llttps:iten.wikipeida.org/wiki/Solidity (Year: 2017), 3 pages.

Zyskind et al., "Decentralizing Privacy: Using Blockchain to Protect Personal Data", IEEE CS Security and Privacy Workshops, 2015, pp. 180-184.

(56) References Cited

OTHER PUBLICATIONS

Bendor-Samuel, P. (2017) Blockchain-enabled "smart-contracts" solve problems in administering IT ecosystem services, CIO, 3 pages.
Final Office Action for U.S. Appl. No. 16/177,305 dated Feb. 2, 2021, 47 pages.
Final Office Action for U.S. Appl. No. 16/264,657 dated May 17, 2021, 36 pages.
Non-Final Office Action, U.S. Appl. No. 16/264,645, dated Oct. 27, 2021, 46 pages.
Normans Media Ltd., "Smart Contracts: Blockchain-based contracts that don't require lawyers", Nov. 17, 2016, 4 pages.
Notice of Allowance for U.S. Appl. No. 16/264,653 dated Jun. 7, 2021, 21 pages.
Notice of Allowance for U.S. Appl. No. 16/683,945, dated Feb. 10, 2021, 14 pages.
Office Action for U.S. Appl. No. 15/885,803, dated Apr. 14, 2021, 31 pages.
Office Action for U.S. Appl. No. 15/932,092 dated Mar. 17, 2021, 23 pages.
Office Action for U.S. Appl. No. 16/177,300 dated Jun. 16, 2021, 80 pages.
Shukla, A., et al., "Smart Contracts for Multiagent Plan Execution in Untrusted Cyber-physical Systems," 2018 IEEE 25th International Conference on High Performance Computing Workshops (HiPCW), 10 pages.
Final Office Action for U.S. Appl. No. 15/885,803 dated Nov. 17, 2021, 28 pages.
Final Office Action for U.S. Appl. No. 15/885,811, dated Feb. 3, 2022, 38 pages.
Final Office Action for U.S. Appl. No. 15/932,092 dated Sep. 27, 2021, 25 pages.
Final Office Action for U.S. Appl. No. 15/932,099 dated Nov. 1, 2021, 35 pages.
Final Office Action, U.S. Appl. No. 16/264,645, dated Aug. 8, 2022, 66 pages.
Mandal, S., "A Framework for Modular Norm Extraction, Modeling, and Reasoning," [Doctoral dissertation, University of Nebraska], 2017, 151 pages, ProQuest Dissertations Publishing.
Non-final Office Action for U.S. Appl. No. 16/399,920, dated Feb. 17, 2022, 66 pages.
Non-final Office Action for U.S. Appl. No. 16/777,409 dated Oct. 4, 2021, 42 pages.
Non-final Office Action for U.S. Appl. No. 16/917,506, dated Oct. 4, 2021, 44 pages.
Non-Final Office Action, U.S. Appl. No. 16/264,645, dated Aug. 15, 2023, 14 pages.
Non-Final Office Action, U.S. Appl. No. 16/264,645, dated Mar. 31, 2023, 66 pages.
Norta, A. et al., "Self-Aware Agent Supported Contract Management on Blockchains for Legal Accountability," 2017, 35 pages.
Notice of Allowance for U.S. Appl. No. 16/177,300, dated Oct. 6, 2021, 14 pages.
Notice of Allowance for U.S. Appl. No. 16/264,653 dated Sep. 29, 2021, 17 pages.
Notice of Allowance for U.S. Appl. No. 16/683,932 dated Dec. 3, 2021, 9 pages.
Office Action for U.S. Appl. No. 15/885,811 dated Aug. 4, 2021, 26 pages.
Office Action for U.S. Appl. No. 16/177,305 dated Sep. 16, 2021, 42 pages.
Office Action for U.S. Appl. No. 16/399,913, dated Dec. 24, 2021, 51 pages.

\* cited by examiner

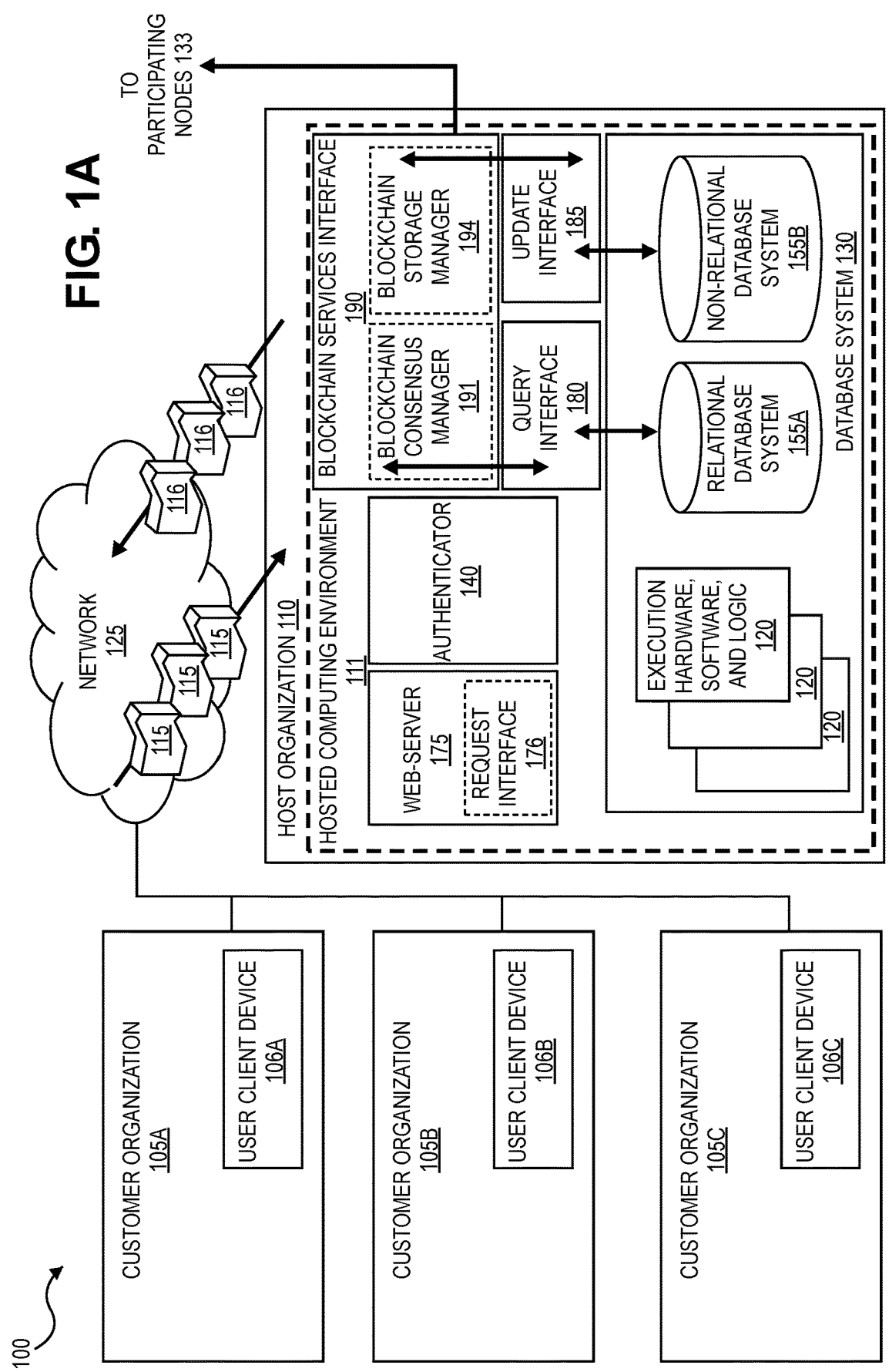

SYSTEM OR METHOD TO QUERY OR SEARCH A METADATA DRIVEN DISTRIBUTED LEDGER OR BLOCKCHAIN

CROSS-REFERENCE TO RELATED APPLICATIONS

This application claims the benefit of U.S. Provisional Application No. 62/841,143 filed Apr. 30, 2019, which is hereby incorporated by reference.

TECHNICAL FIELD

Embodiments disclosed herein relate generally to the field of distributed ledger technology and blockchain platforms. More particularly, the embodiments relate to systems, methods, and apparatuses for query and search of metadata driven distributed ledger or blockchain in a cloud-based computing environment.

BACKGROUND ART

A blockchain is a continuously expanding list of records/blocks that are linked and secured using cryptography. In particular, every block in a blockchain may include a cryptographic hash of the immediately preceding block, a timestamp for the current block, and transaction data (e.g., the addition/modification of information associated with a peer in a blockchain network). Further, the blockchain may be shared and managed through a peer-to-peer network via a system of verifying/validating new blocks to be added to the chain such that a block in a blockchain cannot be altered without alteration of all subsequent blocks, which requires network consensus. This architecture allows for security of information stored within blocks through the use of cryptography; sharing/distribution of information through the use of peer-to-peer networks; trust through the use of consensus of block addition; and immutability of information stored within blocks through the use of cryptography, chaining/linking of blocks, and peer distribution (e.g., each peer in the blockchain network may maintain a ledger of all verified/validated transactions in the network). Blockchains can be utilized to store many different types of data including financial data. Such financial data can be stored in a blockchain that functions as a distributed ledger.

A distributed ledger in blockchain is shared by all of the participants in that blockchain. Distributed Ledger Technology (DLT) helps to address and overcome many of the types of shortcomings of conventional financial systems, however, the technology may nevertheless be expanded to introduce even further benefits to those utilizing such DLT and related blockchain platforms. Presently available DLT and blockchains utilizing such DLT technologies store data in a fixed, immutable, and static manner. Thus, once data is written into the blockchain, it is fixed there, wholly absent of context, metadata, or any other information which describes the stored data, describes the shape of the data, or describes the type of the data. Consequently, it may prove extremely difficult to transform data retrieved from the blockchain back into a format which is acceptable for business objectives due to the lack of context of other metadata describing that stored data.

Further still, presently available DLT and blockchains utilizing such DLT technologies require any record on the blockchain that is updated or modified to be re-written to the blockchain in its entirety, resulting in an explosion of total volume of stored data on the blockchain, which is likely unsustainable and at the least resource intensive. Other conceived approaches write only the modified portion of a record to the blockchain, which results in inefficient data retrieval as the complete record is now split amongst multiple blocks on the blockchain and thus necessitates any retrieval of a modified record to search for, inspect, and retrieve data from multiple blocks on the blockchain.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1A is a diagram of one example architecture including an update interface in accordance with described embodiments;

DETAILED DESCRIPTION

Figure 1B:
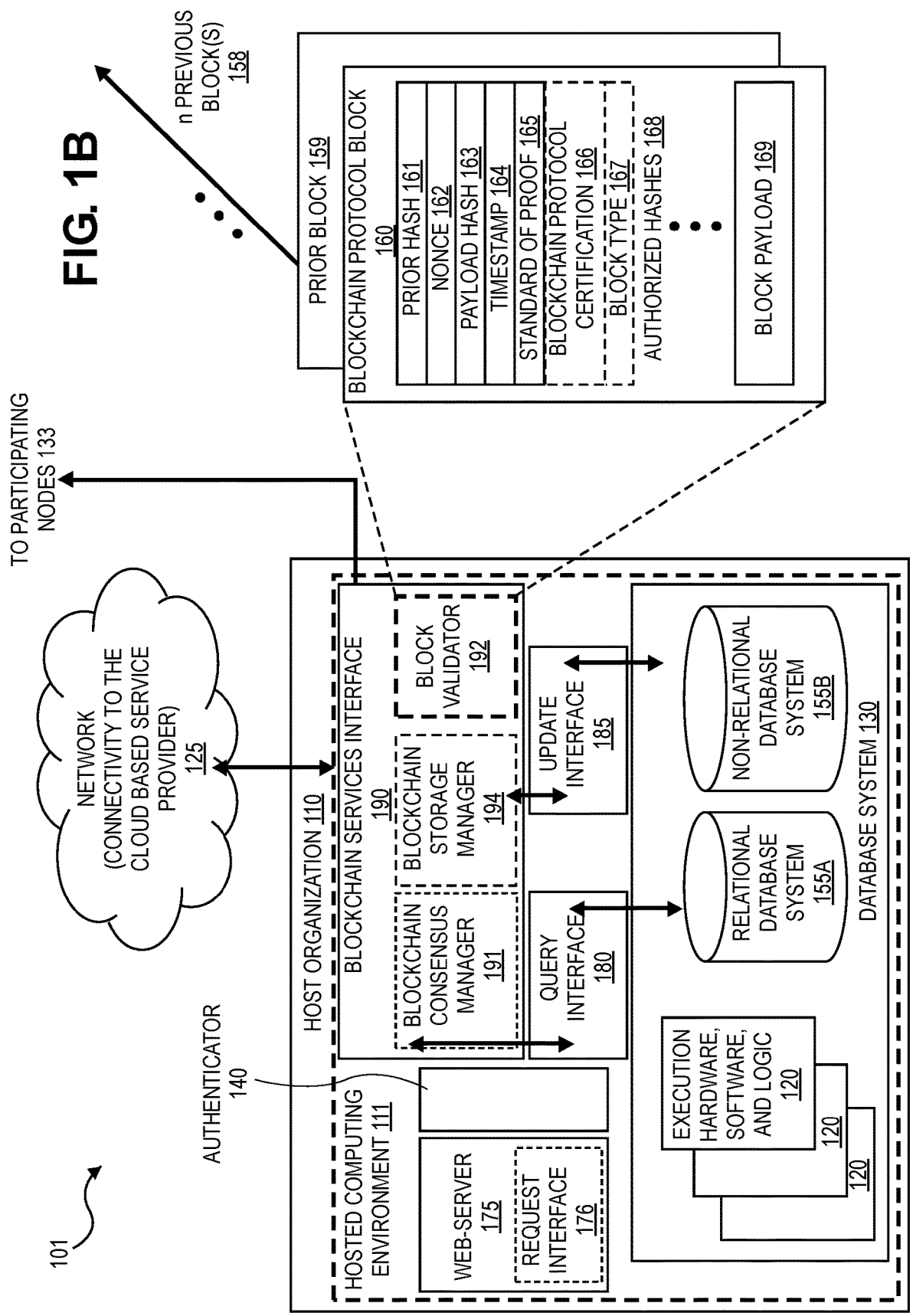
FIG. 1B is a diagram of another example architecture including an update interface, with additional detail of a blockchain protocol block operating in conjunction with a block validator, in accordance with described embodiments.

Described herein are systems, methods, and apparatuses for implementing search and query of data and metadata within a blockchain using, in particular within, Distributed Ledger Technology (DLT) in conjunction with a cloud based computing environment.

FIG. 1A is a diagram of one example architecture 100 including an update interface in accordance with described embodiments In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records including user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 150 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 150 of the database system 130 are separate and distinct from the customer organizations (105A, 105B, and 105C) which utilize web services and other service offerings as provided by the host organization 110 by communicably interfacing to the host organization 110 via network 155. In such a way, host organization 110 may implement on-demand services, on-demand database services or cloud computing services to subscribing customer organizations 105A-C.

In one embodiment, each customer organization 105A-C can be a separate and distinct remote organization, an organizational group within the host organization 110, a business partner of the host organization 110, or a customer organization 105A-C that subscribes to cloud computing services provided by the host organization 110.

Further depicted is the host organization 110 receiving input and other requests 115 from customer organizations 105A-C via network 155 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 155 on behalf of the query interface 180 and for providing a web-based interface or other graphical displays to an end-user user client device 106A-C or machine originating such data requests 115.

Certain requests 115 received at the host organization may be directed toward a blockchain for which the blockchain services interface 190 of the host organization 110 operates as an intermediary.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

In certain embodiments, the Application Programming Interface (API) of the query interface 180 provides an API model through which programmers, developers, and administrators may interact with the blockchain services interface 190 or the database system 130, or both, as the needs and particular requirements of the API caller dictate.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 which facilitates consensus management for private and public blockchains upon which tenants, customer organizations, or the host organization itself 110 operate as a participating node on a supported blockchain. Additionally, depicted is the blockchain storage manager 194 which enables the blockchain services interface 190 to efficiently store data and metadata to a blockchain which is interfaced via the blockchain services interface. For instance, via the blockchain storage manager 194, it is possible to store records more efficiently, for those records transacted onto the blockchain utilizing the cloud computing platform provided by the host organization.

As shown here, the blockchain services interface 190 communicatively interfaces the host organization 110 with other participating nodes 133 (e.g., via the network 155) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110. In certain embodiments, the host organization 110 both provides the blockchain protocol upon which the host organization then also operates as participating node. In other embodiments, the host organization merely operates as a participating node so as to enable the host organization 110 to interact with the blockchain protocol(s) provided by others.

According to certain embodiments, the blockchain storage manager 194 additionally permits direct retrieval of stored records from the blockchain via the use of an index. In certain embodiments, the index itself is stored on the blockchain while in other embodiments, the index may be stored within the host organization's database system 130, which is then referenced by the host organization (e.g., via the query interface 180) and then index information is then utilized to directly retrieve a record from the blockchain utilizing an address or index retrieved from the database system 130. Without such an indexing scheme, it is necessary to traverse the entirety of the blockchain from the end of the chain until the desired record is found.

In other embodiments, the data of the blockchain is replicated in a set of tables or similar format within the database system 130. As blocks in the blockchain are updated, the update interface 185 replicates the information added or modified in the blockchain into a set of records and/or tables in the database system 130. The update interface 185 can detect an event generated by a block being committed in the blockchain. The event can be generated by the blockchain storage manager 194 or similar component. The update interface 185 can then determine the tables or records to modify or create in the database system 130 based on the type of data or metadata that is affected. The tables or records are updated or modified in the database system 130 to enable standard types of queries and searches to be performed on the data using structured query language (SQL) and similar database search and query tools.

As previously set forth, the blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain. This iterative process confirms the integrity of the previous block, all the way back to the first block in the chain, sometimes called a genesis block or a root block.

By storing data across a network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, and similar consensus mechanisms.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110. The embodiments are thus compatible with any type of blockchain that meets any of the definitions of a blockchain described herein.

Open, permission less, or public, blockchain networks can guard against bad actors inherently and specific mechanisms to thwart them are not required and no access control is needed. This means that applications may be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

FIG. 1B is a diagram of another example architecture 101 including the update interface 185, with additional detail of a blockchain protocol block 160 operating in conjunction with a block validator 192, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 is organized.

According to certain embodiments, the blockchain storage manager 194 as shown here may utilize a specific blockchain implementation for use in conjunction with a specialized indexing scheme for stored records written to the blockchain so as to enable more efficient data location and retrieval of the stored records persistently stored via the blockchain. In other embodiments, the host organization 110 may operate as a participating node within a public or a private or a permissioned blockchain which is then made accessible to the tenants of the host organization via the cloud computing platform including for use with the declared smart actions configured by such tenants.

It may be necessary in accordance with certain embodiments that a customized blockchain protocol implementation be provided by the host organization to support use of the indexing scheme, however, in embodiments where the index is stored within the host organization 110, any blockchain utilized to persist the stored records will be unaffected as the blockchain is agnostic as to the use of the indexing scheme implemented by the host organization. Where the host organization implements a customized blockchain protocol implementation, the host organization may be enabled to provide an overall greater suite of functionality to tenants of the host organization 110 and users of any applications provided by such tenants.

With respect to the blockchain protocol 160 (regardless of whether it is an existing and already available blockchain protocol or a custom implemented blockchain protocol), the prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 162 provides a hash of the data stored within the block payload 169 portion of the blockchain protocol block 160 and need not meet any specific standard of proof 165. However, the payload hash is included as part of the input when the hash is calculated for the purpose of storing as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a time stamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standard of proofs 165 may utilized pursuant to the particular blockchain protocol chosen, such as proof of work, hash value requirements, proof of stake, a key, or some other indicator such as a consensus, or proof of consensus. Where consensus-based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may be all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

Figure 2A:
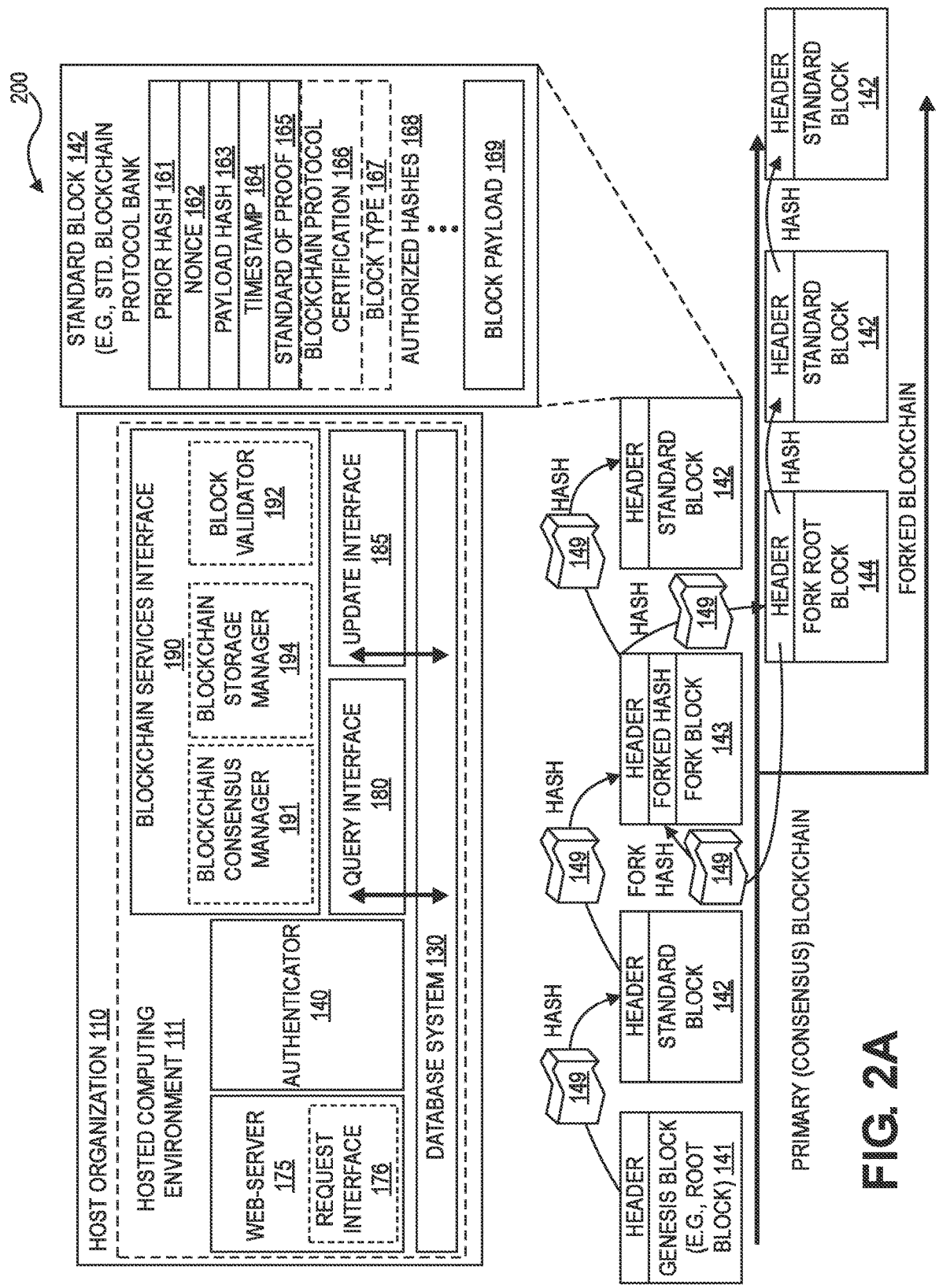
FIG. 2A is a diagram of another example architecture including an update interface, with additional detail of a blockchain and a forked blockchain, in accordance with described embodiments.

FIG. 2A is a diagram of another example architecture 200 including the update interface 185, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary blockchain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing and potentially valid primary blockchains. Once consensus is reached (typically after one or two cycles of new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

For instance, a forked blockchain may be utilized to support declarative smart actions as enabled by the host organization where a forked blockchain of a public or private blockchain is customized via a new blockchain protocol certification 166 to support both the declarative establishment of smart actions and their required information capture provisions as defined by an administrator as well as the ability to map the data captured with a transaction utilizing such a declared smart action back to the cloud platform entity as provided by the host organization.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which declared smart actions for assets, tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

Consider for instance the host organization's use of a previously existing blockchain for the implementation of the services provided by the blockchain storage manager 194. It may be advantageous to utilize an existing blockchain, but then creating a specialized sidechain or a forked blockchain specifically for the services provided by the blockchain storage manager 194 yet remain in compliance with the blockchain protocol certification 166 required by the primary (consensus) blockchain.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C#, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

Unless specified, the functions of the update interface 185 as described herein can be utilized with relation to a primary consensus blockchain, a sidechain, forked chain, similar blockchains and blocks and related metadata as well as any combination of these blocks and blockchains.

Figure 2B:
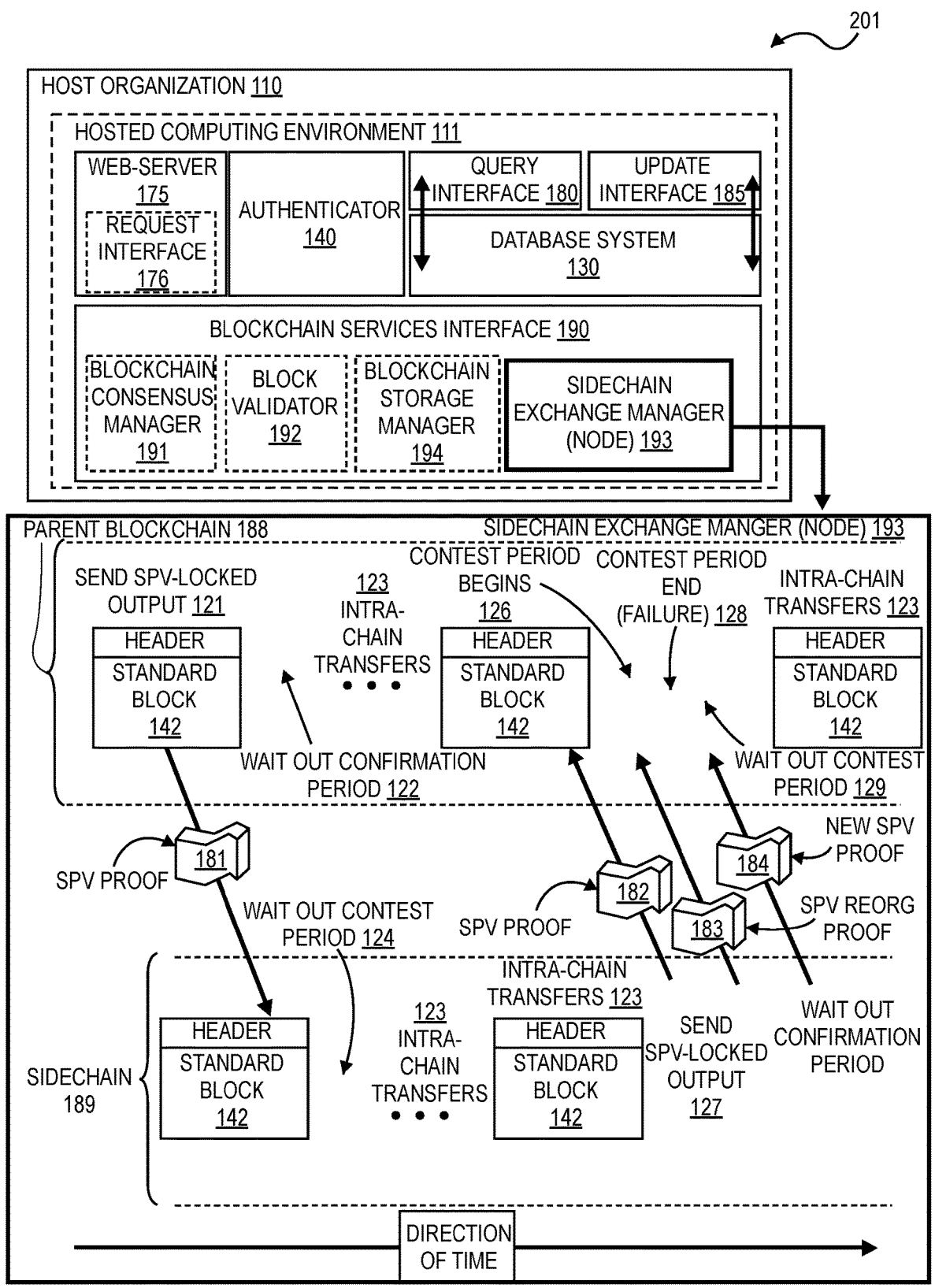
FIG. 2B is a diagram of another example architecture including an update interface with additional detail for sidechains, in accordance with described embodiments.

FIG. 2B is a diagram of another example architecture 201 including an update interface 185 with additional detail for sidechains, in accordance with described embodiments.

More particularly, there is depicted here mechanism by which to perform a symmetric two-way pegged transfer from a parent blockchain 188 (e.g., e.g., a primary chain) to a sidechain 189, which may be a different blockchain protocol supported by and provided by the host organization 110 or the sidechain may be a foreign blockchain, public or private, for which the sidechain exchange manager 193 of the host organization 110 participates as a node, so as to permit access and transactional capabilities with the sidechain.

Regardless, it is in accordance with described embodiments that inter-chain transfers between the parent blockchain 188 and the sidechain 189 may permissibly performed in compliance with the rules and conditions of each respective blockchain. Notably, as described here, the perspective of each blockchain is interchangeable insomuch that the sidechain 189 depicted here may consider itself as a primary or parent blockchain and consider the depicted parent blockchain 188 as the child blockchain or a sidechain. Regardless, each blockchain operates independently, yet has a defined exchange mechanism by which to exchange assets, coins, tokens, value, or other payload information between them which have been created by a transaction utilizing a declared smart action.

As shown here, the sidechain exchange manager 193 of the host organization may send a parent chain asset as an output of the parent blockchain 188 at operation 151.

A Simplified Payment Verification (SPV) proof 181 associated with the parent blockchain 188 asset is generated as the output and communicated to the sidechain 189. The SPV proof may include a threshold level of work, and the generating may take place over a predetermined period of time, which may also be referred to as a confirmation period 152. The confirmation period of a transfer between chains may be a duration for which a coin, token, or other exchanged value is locked on the parent blockchain 188 before may successfully be transferred to the sidechain 189. This confirmation period may allow for sufficient work to be created such that a denial of service attack in the next waiting period becomes more computationally difficult.

Consider for instance an example confirmation period which may be on the order of 1-2 days. The confirmation period may be implemented, in such an example, as a per-sidechain security parameter, which trades off cross-chain transfer speeds in exchange for greater security. Other confirmation periods which are much shorter may be utilized where sufficiently difficult proof of work conditions are effectuated so as to ensure adequate security so as to protect the integrity of both blockchains and negate the potential for fraudulent transactions.

The output created on the parent blockchain 188 may specify via rules and configuration parameters (e.g., stored within the blockchain protocol certification portion of each block of the parent blockchain 188) a requirement that any spending, transfer, or consumption of an asset received by the output in the future are burdened with additional conditions, in addition to the rules governing transfer within the parent chain. For example, any release of assets received by the output may require additional conditions for verifying a proof from the destination chain, such as validating that the rules for the destination chain proof show that the destination chain has released the asset and show to where the asset has been released. After creating the output on the parent blockchain 188, the user waits out the confirmation period, meanwhile, intra-chain transfers 153 continue to occur. Subsequent to waiting out the confirmation period, a transaction is then created on the sidechain 189 referencing the output from the parent blockchain 188.

The sidechain, using a sidechain validator service, such as the block validator 192 of the host organization, is then provided with an SPV proof that shows the parent chain asset was created and encumbered by sufficient work within the parent chain. A sidechain validator service (e.g., block validator 192 if performed by the host organization's available services) will then validate that the SPV proof associated with the parent blockchain 188 asset meets the required threshold level of work indicated by the SPV proof at operation 154 and a 189 asset corresponding to the parent blockchain 188 asset is then generated.

The generated sidechain 189 asset also may be held for a predetermined contest period at operation 154, during which time the transfer will be invalidated if a reorganization proof 183 associated with the parent blockchain 188 asset is detected in the parent blockchain.

The contest period at operation 154 may be a duration during which a newly-transferred token, coin, value, or payload data may not be spent, accessed, or consumed on the sidechain 189. The predetermined contest period is implemented to prevent any possibility for double-spending in the parent blockchain 188 by transferring previously-locked coins, tokens, value, or payload data during a reorganization. If at any point during this delay, a new SPV proof 184 (known as a "reorganization proof") is published containing a chain with more aggregate work which does not include the block in which the lock output was created, the conversion is retroactively invalidated. If no reorganization proof is detected, the sidechain asset may be released. All participating nodes on the sidechain have an incentive to produce reorganization proofs if possible, as the consequence of a bad proof being admitted degrades the value of all sidechain tokens, coins, value, or trust in the authenticity of payload data stored by the sidechain 189.

Similar to the above, an example contest period at operation 156 may also be on the order of 1-2 days. To avoid these delays, users may instead employ use atomic swaps for fungible transfers, so long as a liquid market is available. Where the exchanged asset is a unique or less common token, value, or payload data, atomic swaps will not be feasible, and a sidechain transfer must instead occur, despite the necessity of a potentially lengthy 1-2 day waiting period.

Upon eventual release of the sidechain asset, the side chain asset corresponding to the parent chain asset may then be transferred or consumed within the sidechain one or more times the intra-chain transfers 153 of the sidechain 189. While locked on the parent blockchain 188, the asset is freely transferable within the sidechain and without requiring any further interaction with the parent blockchain 188, thus permitting the sidechain 189 to again operate wholly independently. Notwithstanding the above, the sidechain asset retains its identity as a parent chain token, coin, value, or payload data and may therefore, if the need arises, be transferred back to the originating parent blockchain 188 from which the sidechain asset originated. In certain embodiments, transfers are relegated to only a single hop, such that an asset cannot be transferred to a sidechain 189 and then transferred again to another sidechain, where it is necessary to prevent obfuscation of the source. Such restrictions are dependent upon the particular blockchain protocol chosen and the define exchange agreement (e.g., pegging conditions) established between a parent blockchain 188 and a sidechain 189.

Where it becomes necessary to redeem a sidechain asset in the parent blockchain 188, the sidechain asset may be sent to an output of the sidechain as depicted at operation 157. An SPV proof 182 associated with the sidechain asset is thus generated and communicated to the parent blockchain 188. A parent chain validator service, such as the block validator 192 of the host organization 110, may validate the SPV proof 182 associated with the sidechain asset at operation 156. The validated the SPV proof 182 associated with the sidechain 189 asset may include, for example, validation that the SPV proof 182 associated with the sidechain asset meets the threshold level of work indicated by the SPV proof 182 associated with the sidechain asset.

As before, the parent chain asset associated with the sidechain asset may be held for a second predetermined contest period at step 156, during which a release of the parent chain asset is denied at operation 128 if a reorganization proof 183 associated with the sidechain asset is detected in the sidechain. The parent chain asset may be released if no reorganization proof 183 associated with the sidechain asset is detected.

If validation failure occurs with respect to the second SPV proof 184, after the reorganization proof 183 is received, then a second SPV proof 184 associated with the sidechain asset may be received and validated by the parent blockchain 188 during a third predetermined contest period at operation 159. The parent blockchain 188 asset may be released if no reorganization proof associated with the sidechain asset is detected during the third predetermined contest period, after which the parent chain asset is free to be transferred within the parent chain via the depicted intra-chain transfers 153 shown at the rightmost side of the parent blockchain 188 flow.

Because pegged sidechains may carry assets from many different blockchains, it may be problematic to make assumptions about the security of the other foreign blockchains. It is therefore required in accordance with certain embodiments that different assets are not interchangeable (except by an explicit trade) within the sidechain. Otherwise, a malicious user may potentially execute a fraudulent transaction by creating a worthless chain with a worthless asset, and then proceed to move the worthless asset from their worthless chain into the primary blockchain 188 or into a sidechain 189 with which the primary blockchain 188 interacts and conducts exchanges. This presumes that the worthless chain secures a pegged exchange agreement with the sidechain. However, because the rules, configuration options, and security scheme of the sidechain 189 is not controlled by the parent blockchain 188 (assuming the sidechain is a foreign sidechain and not another blockchain protocol provided by the host organization 110), it simply cannot be known with certainty that the sidechain 189 being interacted with does not contain such vulnerabilities. To negate this potential security vulnerability, the sidechain 189 may be required, as per the pegged exchange agreement, to treat assets from separate parent blockchains as wholly as separate asset types, as denoted by the block type portion of a blockchain protocol block as depicted at FIG. 1B, element 167.

With a symmetric two-way pegged sidechain transfer, both the parent blockchain 188 and sidechains 189 may perform SPV validation services of data on each other, especially where the parent blockchain 188 is provided the host organization and where the sidechain is a foreign sidechain for which the host organization is merely a participating node via the sidechain exchange manager node 193. Because the parent blockchain 188 clients (e.g., participating nodes) do not observe every sidechain, users import proofs of work from the sidechain into the parent chain in order to prove possession. In a symmetric two-way peg, the reverse is also true. For example, to use Bitcoin as a parent blockchain 188, an extension script to recognize and validate such SPV proofs may be utilized. To facilitate such transactions, the SPV proofs are sufficiently small in size so as to fit within a Bitcoin transaction payload. However, such a change may alternatively be implemented as a forking transaction, as described previously, without affecting transactions not involved in pegged sidechain transactions. Stated differently, using symmetric two-way pegged sidechains as described above, no further restrictions need to be placed upon any transaction deemed valid within Bitcoin.

Through the use of such pegged sidechains transactions, independent blockchains are made to be flexible enough to support many assets, including assets that did not exist when the chain was first created. Each of these assets may be labeled with the blockchain from which it was transferred so as to ensure that transfers may be unwound (e.g., transferred back) correctly.

According to certain embodiments, the duration of the contest period is made as a function of the relative hashpower of the parent chain and the sidechain, such that the receiving sidechain (or the parent blockchain with an incoming transfer) may only unlock tokens, coins, value, or data payloads, given an SPV proof of one day's worth of its own proof-of-work, which may, for example, correspond to several days of the sending blockchain's proof-of-work. Security parameters of the particular sidechain's blockchain protocol implementation may thus be tuned to each particular sidechain's implementation.

According to described embodiments, the blockchain validator 192 may require, utilize, or apply various types of consensus management to the blocks requiring validation.

When a block containing a particular asset or transaction is to be added to the blockchain, the transaction type database is queried using the type of the particular asset or transaction that is to be added to the blockchain to determine the corresponding consensus protocol type that is to be used to commit the particular asset or transaction, or block containing the particular asset or transaction, to the blockchain. For example, in the database, a transaction type of "loan" may be associated with a consensus protocol type of "proof of stake" (PoS), an asset type of "document" may be associated with a consensus protocol type of "Byzantine Fault Tolerant" (BFT), an asset or transaction type of "currency" may be associated with a consensus protocol type of "proof of work" (PoW), and a default transaction type to be used in the case of an otherwise unenumerated transaction type in the database may be associated with a default consensus protocol type, say, PoS. Another transaction type may correspond to an asset type having metadata stored therein, possibly typed as "metadata," while a closely related transaction type stores a "related entity" as metadata within the blockchain having a transaction type of either "metadata" if it shares the same type as normal metadata or having a transaction type of "related entity" if separate. Still further, a "stored record" transaction type may be utilized to store a record having multiple distinct data elements embedded therein, typically which will be defined by metadata specified by an application developer.

For instance, when a block or transaction within a block having a particular transaction type corresponding to transactions utilizing a declared smart action is to be added to the blockchain, the consensus protocol type to be used to commit the block or transaction therein to the blockchain is PoS, when a block or transaction therein with a particular asset having the type "document" is to be added to the blockchain, the consensus protocol type to be used to commit the block or transaction therein to the blockchain is BFT, and when a block or transaction therein with a particular transaction having a transaction type that is not specified in the database is to be added to the blockchain, then the default consensus protocol type of PoS is to be used to commit the block or transaction therein to the blockchain.

This selected consensus protocol type may be communicated to the nodes in the consortium for use in for validating the request to add the new block or transaction therein to the blockchain. According to certain embodiments, the host organization 110 receives validation of the request to add the new block or transaction therein to the blockchain when the nodes in the consortium reach consensus according to the selected consensus protocol to add the block or transaction therein to the blockchain and communicate such to the host.

Any relevant factors may be used in determining which nodes participate in the consensus protocol, including, for example, the selected consensus protocol itself, a particular node's computing resources, the stake a particular node has in the consortium or the selected consensus protocol, relevant (domain) knowledge a particular node has, whether that knowledge is inside (on-chain) or outside (off-chain) with regard to the blockchain or consortium, a particular node's previous or historical performance, whether in terms of speed or accuracy, or lack thereof, in participating in the selected consensus protocol, the block number of the new block being added to the blockchain, the number of transactions in the new block, the size of the block, and the fiduciary or nonfiduciary nature of the assets or transactions in the block being added to the blockchain.

According to a particular embodiment, the host organization 110 receives from each of one or more of the nodes in a peer-to-peer network a weighted vote to validate or to add a new block or transaction therein to the blockchain, in response to the request, or in response to a request for a vote issued by the blockchain platform host. These nodes learn of the request either through a blockchain protocol packet broadcast by the node generating the request, or by communication with other nodes in the consortium or the blockchain platform host providing notice of the request in conjunction or combination with the request for a vote transmitted by the blockchain platform host. The host organization then responsively validates, or receives validation of, the request to add the new block or transaction therein to the blockchain when a sum of the received weighted votes exceeds a threshold.

According to another embodiment, a consortium of nodes participate in a private, or permissioned, blockchain within which each node is assigned a weight that its vote will be given, for example, based on domain (general) knowledge about the transactions, or types of transactions, the nodes may add to a new block in the blockchain. Certain nodes may be given a zero weight within such a permissioned blockchain, whereas other nodes may be given such a significant weight that their vote is near controlling or even controlling when combined with a limited number of other highly weighted nodes, depending upon the particular implementation.

Before a node adds a transaction to a new block of the blockchain, or before the new block including the transaction may be added to the blockchain, other nodes in the consortium vote on adding the transaction to the new block for the blockchain and/or adding the new block to the blockchain. When a majority of nodes agree the transaction and/or new block is valid and may thus be accepted as a valid block on the primary blockchain, the transaction and/or new block is added and accepted to that primary blockchain, sometimes called the main chain or the consensus chain. For instance, while an invalid block may be added to the blockchain, such an invalid block in effect creates a side chain which fails to attain consensus, and thus, is never accepted as an added valid block within the main or primary blockchain. Nodes are weighted such that a "majority" may be obtained or denied based on the votes of one or more of the nodes participating in the private blockchain, that is, a majority may be obtained from less than all of the nodes participating in the blockchain.

According to this embodiment, the parties in the consortium agree upon the weight, w, to assign each node in the consortium, for example, based on a party's domain knowledge, and/or other criteria, including, for example, a party's participation in another blockchain or sidechain. The total weight, W, of the nodes in the consortium is equal to the sum of the individual node weights, $w_1+w_2+ \ldots w_n$, where n is the number of nodes in the consortium. The weight, w, of any one member, or the ratio of w/W may or may not exceed a certain threshold, in one embodiment. Each node's weight is attributed to the respective node's vote. If the sum of the weights for the nodes that voted exceed a certain threshold, the transaction/new block is validated and added to the blockchain. In particular, the transaction/new block is added if the total weight, W, attributed to the votes meets or exceeds a threshold (e.g., a plurality, majority, supermajority, in terms of percentage of w/W, or absolute value for w, whatever is agreed upon by the consortium) to reach consensus for the blockchain. In this embodiment, the nodes in the blockchain do not need to come to unanimous agreement about adding the transaction and/or new block to the blockchain, and indeed, after the threshold is met, a node need not begin, or continue, to participate in the voting process.

In one embodiment, at least a minimum number of nodes, k, vote on adding a transaction to the new block in the blockchain, or adding the new block that includes the transaction to the blockchain, to mitigate the risk of fraud or double-spending, or to prevent one node with a large weight, w, or a small group of nodes with a collectively large weight, from controlling the outcome of the vote. In one embodiment, the number of nodes that participate in voting, k, or the ratio of k/n must meet a minimum threshold.

Figure 3:
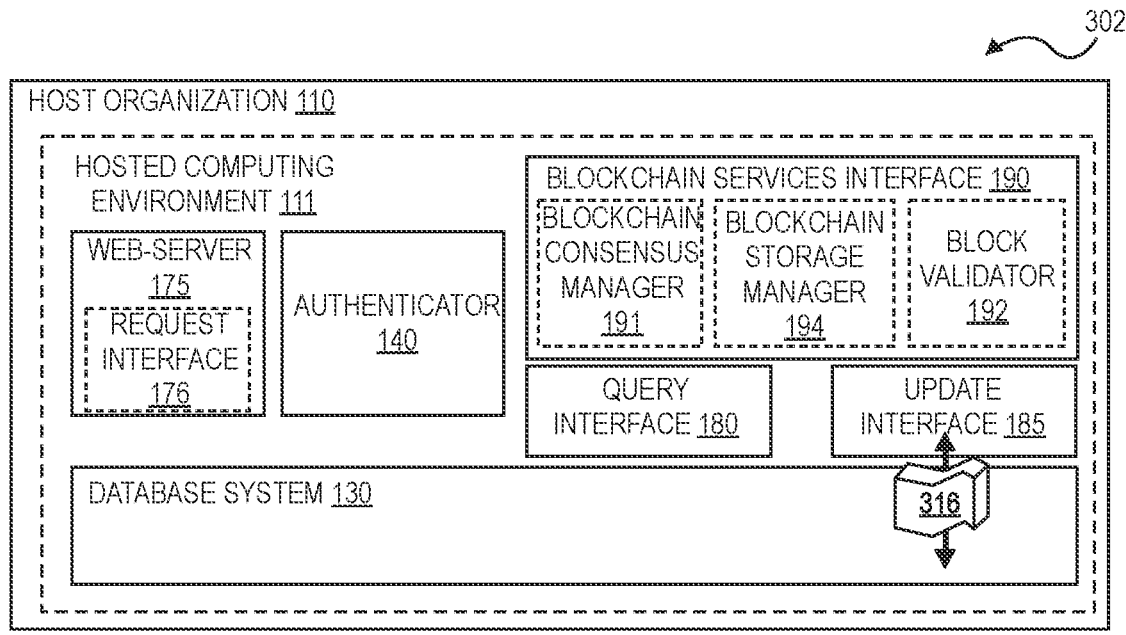
FIG. 3 is a diagram of an example architecture including a update interface and storage of metadata in a blockchain in accordance with described embodiments.
Figure 3:
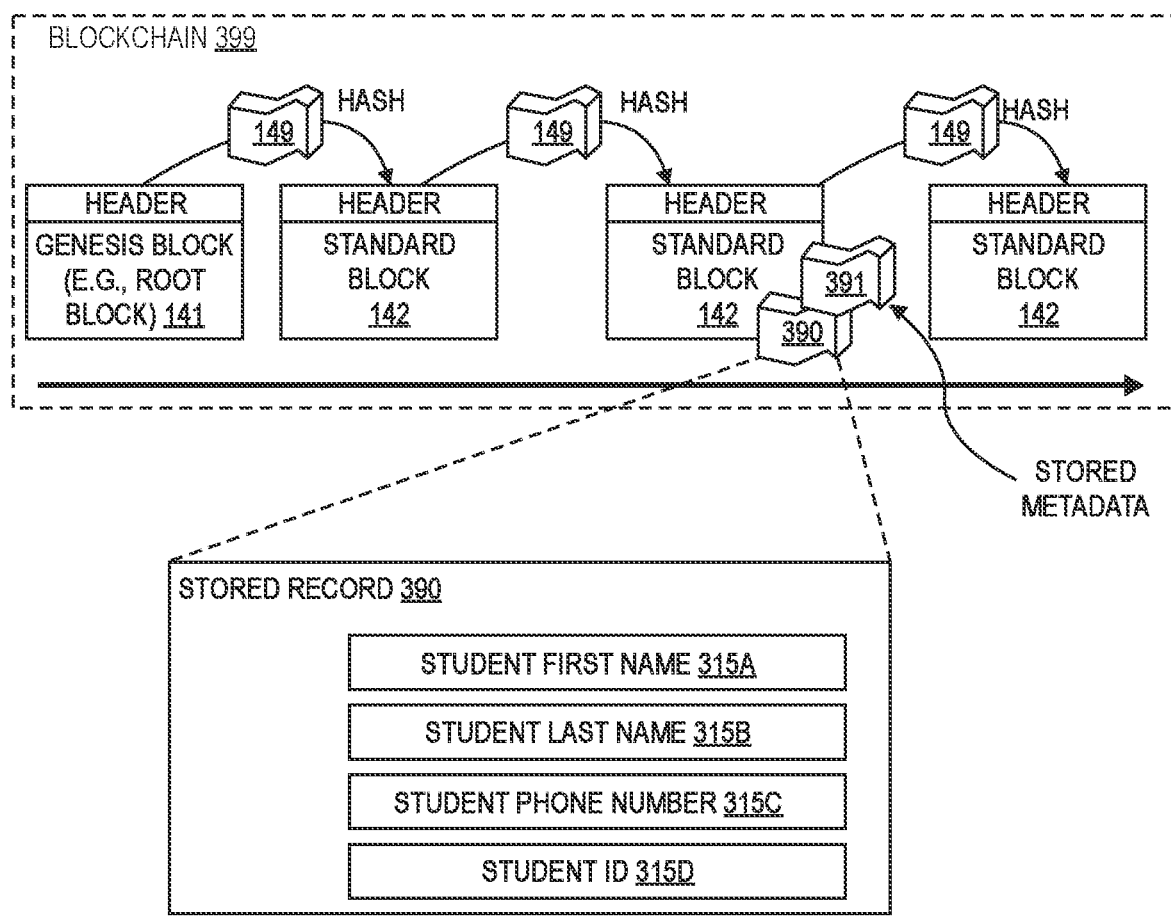

FIG. 3 is a diagram of another example architecture 302 including the update interface 185 in accordance with described embodiments.

This example architecture also includes the host organization 110 which includes the hosted computing environment 111 having a processors and memory (e.g., within the execution hardware, software, and logic 120 of the database system 130) which serve to operate the blockchain services interface 190 including the blockchain consensus manager 191 and the blockchain storage manager 194. The update interface 185 manages records 316 by which to enable the search or query of data in the blockchain 399. There is additionally depicted an example newly stored record 390 at the second to last block of the blockchain 399.

Here the stored record 390 stores student information including a student first name 315A, a student last name 315B, a student phone number 315C, and a student ID 315D.

Once the stored record 390 is transacted onto the blockchain, for instance, by adding an asset to the blockchain within which the stored record 390 is embodied, student data is persistently stored by the blockchain and accessible to participating nodes with access to the blockchain 399, however, when such data is retrieved, the stored record does not in of itself describe how to use such data, any particular format for such data, or how to validate such data. Therefore, the update interface 185 can store metadata within the database 130 and a copy of metadata 391 in the blockchain which may then be used to define the format, validation means, and use for such data. Storage of the metadata in the database system 130 does not exacerbate the problem of searching for and retrieving data from the blockchain, because the embodiments provide a stored set of records 316 and also stored metadata 391 in the blockchain 399 which is associated with that record. A method is provided as implemented by the update interface 185 in conjunction with use of the records in the database system 130 that provides for more efficient storage, retrieval, and validation of data stored on the blockchain or related sidechains and forked chains.

According to one embodiment, the stored record 390 is therefore converted to a more efficient format for storage within the blockchain. Consider the stored record 390 for which student information is stored. Initially, the stored record 390 may include only student first name 315A and student last name 315B, and is then stored. Subsequently, the student record is updated to include student phone number 315C, and thus, either the stored record 390 is updated and re-written to the blockchain in its entirety thereby creating a second copy, albeit updated, of the stored record 390 or alternatively, only the newly added data for the record is added to the blockchain, e.g., the student phone number 315C can be written to the blockchain with a reference back to the prior record, in which case total storage volume is reduced. Without the correlated data (e.g., related metadata) being stored in the database system 130 the retrieval of the entire record would require searching for and finding multiple blocks on the blockchain from which to reconstruct the entire stored record 390. If the student ID 315D is subsequently assigned, then the stored record 390 needs to be updated again, thus writing yet another entire stored record 390 to the blockchain resulting in now three different versions and copies on the blockchain, or as before, writing only the new portion of the stored record to the blockchain 399, in which case the stored record 390 is fragmented across at least three blocks of the blockchain. However, this data can be stored and updated in the database system 130 without complicating the search or query for the data since the database system 130 can be updated or modified without the limitations placed on the blockchain 399.

This potential for fragmentation of data in the blockchain is problematic because if there is a search for student information, it may result in a first block containing the student's first name and last name, a second block containing a change to the student's last name due to an update, a third block containing only the student's phone number. Consequently, it is necessary to traverse the blocks of the blockchain to retrieve all the fragmented pieces so as to reconstruct the entire stored record 390 before it may be used by whatever application requires the data.

According to one embodiment, the update interface 185 writes data or metadata into the database system 130 by monitoring for committed transaction events and mapping the transactions to correlated records in the database system 130. The update interface 185 can correlate blockchain data and metadata to records in the database system 130 by using unique identifiers from the correlated blocks in the records such that updates to those blocks will be mapped to the associated records and tables in the database system 130.

According to one embodiment, the data or metadata to be written to the blockchain 399 is converted to a JSON format to improve storage efficiency. JavaScript Object Notation (JSON) provides an open-standard file format that uses human-readable text to transmit data objects consisting of attribute-value pairs and array data types or any other serializable value. It is a data format used for asynchronous browser-server communication, including as a replacement for XML in some AJAX-style systems.

Thus, data or metadata to be written to the blockchain may be converted into a JSON format (e.g., within database system 130 of the host organziation 110) and the validated and converted JSON data is then transacted onto the blockchain.

Metadata, as defined by the application seeking to store the data onto the blockchain, can specify formatting of data and similar information related to the data that aides in the interpretation, typing, and use of the data to be stored in a block of a blockchain. For example, a student record to be stored in the example blockchain 399, has three mandatory fields and one optional field, such as mandatory first name, last name, and student ID, and optionally a student phone number. The metadata can further define a format, data mask, or restrictions for the data fields, such as the name fields must not have numbers, and the phone number must have a certain number of digits, and similar restrictions. Multiple different applications can store data onto the blockchain, with each of the multiple different applications defining different metadata for their respective stored records.

In the example of the saved student record as described above, there is a student record saved to the blockchain having, for example, a student first name, student last name, student phone number, and a student ID. Also stored was metadata defined by an application seeking to store the student record.

According to further embodiments, related entities (e.g., metadata or other related data) are stored on the blockchain and linked with the previously stored record. For example, a stored student record on the blockchain for which a new student transcript is provided can be linked in this manner.

A link related entity process is performed in which retrieved data is modified to add a UUID field identifying the related entity, providing a link between the related entity and the data record previously stored on the blockchain and retrieved for modification. This results now in data with the UUID field, which has not yet been stored. Next, the data with the UUID field linking and identifying the new related entity is then written to and stored within the blockchain, resulting in the stored record now having the original data of the stored record, but also a UUID field linking to and identifying the new related entity. Next, the related entity is written to the blockchain as metadata with the same UUID data field, thus permitting subsequent retrieval of the related entity from the blockchain by first referencing the UUID within the stored record and then retrieving the linked related entity stored within the blockchain as metadata.

Thus, if a student record defines the student's name, phone number, and student ID, then a transcript for the student may be stored as metadata on the blockchain. A new UUID is automatically generated for the transcript to be stored and then within the student record, a related entity field within the student record is updated to store the new UUID generated for the transcript, thus linking the student record updated with the related entity field identifying the UUID for the transcript with the separately stored transcript which is written to the blockchain as stored metadata. In such a way, any number of related entities may be added to the blockchain, each being stored as metadata within the blockchain and linked to another stored record via the data field for the related entity. Multiple related entity fields may be added to any record, each using a different UUID to link to and identify the related entity in question. For instance, if the student has a transcript and also medical records, each are separately saved to the blockchain as metadata, each identified separately by a unique UUID, and each UUID being updated within the student's stored record as separate related entity fields. As before, the updated record with the related entity field identifying the UUID for the separately stored related entity may be stored as a new copy or as a serialized version.

Figure 4:
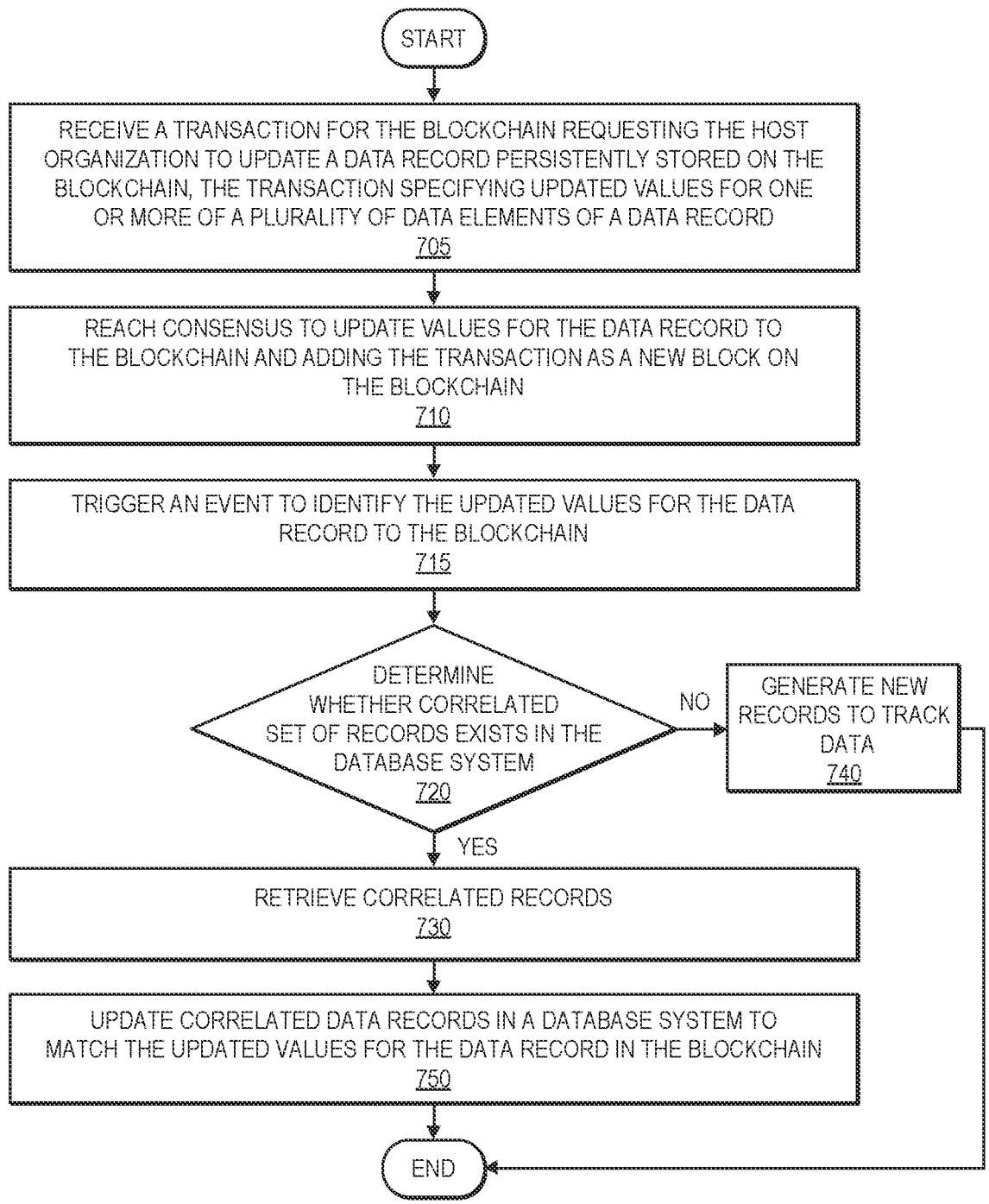
FIG. 4 is a flow diagram illustrating a method for updating data and metadata within a blockchain using Distributed Ledger Technology (DLT) in conjunction with a cloud based computing environment such as a database system implementation supported by a processor and a memory to execute such functionality to provide cloud based on-demand functionality to users, customers, and subscribers, in accordance with described embodiments.

FIG. 4 is a flow diagram illustrating a method 700 for implementing efficient and quick search of data within a blockchain, for example, using Distributed Ledger Technology (DLT) in conjunction with a cloud-based computing environment. The method utilizes a database system implementation supported by a processor and a memory to execute such functionality to provide cloud based on-demand functionality to users, customers, and subscribers.

Method 700 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 190, the update interface 185, and the database system 130 as depicted at FIGS. 1A-3, and other systems and components as described herein may implement the described method and functions. Some of the blocks and/or operations listed below are optional in accordance with certain embodiments. The numbering of the blocks presented is for the sake of clarity and is not intended to prescribe an order of operations in which the various blocks must occur.

With reference to the method 700 illustrated in FIG. 4, at block 705, processing logic operates a blockchain interface for a blockchain on behalf of a plurality of tenants of the host organization, in which each one of the plurality of tenants operate as a participating node with access to the blockchain, where a transaction is received to update a data record that is persistently stored on the blockchain. The received transaction specifies updated values for one or more of a plurality of data elements of a data record.

At block 710, processing logic executes the blockchain consensus manager to coordinate between the participating peers in the blockchain to implement a consensus algorithm to decide whether the transaction is to be committed to the blockchain and to select a block to store the transaction information into the selected block. The transaction can contain information that updates data or metadata that was previously added to the blockchain. Where consensus is reached to commit the transaction the processing logic writes the updated values for the data record to the blockchain by adding the transaction to a new block on the blockchain.

According to one embodiment of method 700, writing the updated values for the data record to the blockchain by adding the transaction to a new block on the blockchain includes writing the updated values into the new block on the blockchain with a reference to a prior block on the blockchain; in which retrieval of a complete and current version of the data record requires any data elements of the stored data record which are not modified by the updated values to be retrieved from the prior block on the blockchain based on the reference and retrieval of the updated values from the new block on the blockchain.

For example, a stored data record can be represented by multiple blocks on the blockchain, with newer updated information being stored within a new block of the blockchain along with a reference pointer to a prior location on the blockchain from which the non-updated values of the stored data record may be retrieved.

According to another embodiment, method 700 further includes receiving a first transaction for the blockchain requesting the host organization to store the data record on the blockchain as a new stored data record, in which the new stored data record includes a plurality of data elements embedded therein as specified by the first transaction; and in which receiving the transaction for the blockchain requesting the host organization to update the data record persistently stored on the blockchain includes receiving a second transaction for the blockchain, in which the second transaction specifies the updated values for the new stored data record previously transacted onto the blockchain.

For example, an original and new record to be stored to the blockchain is still subjected to data validation, however, there is no need to update an original and new data record. Subsequently, updates to the original data record may be applied and stored on the blockchain subject to data validation.

According to another embodiment, method 700 further includes receiving a first transaction for the blockchain requesting the host organization to store metadata on the blockchain, the metadata defining a valid format for the data record and the plurality of data elements stored by the data record; in which receiving the transaction for the blockchain requesting the host organization to update the data record persistently stored on the blockchain includes receiving a second transaction for the blockchain, in which the second transaction specifies the updated values for the stored data record as previously transacted onto the blockchain.

For example, the metadata defining the appropriate format for the record may be permissibly stored onto the blockchain.

According to another embodiment, method 700 further includes rejecting the transaction and prohibiting the updated values from being written to the data record persistently stored to the blockchain upon a failed consensus for the transaction.

According to another embodiment, method 700 further includes determining a transaction type based on the transaction received.

For example, transactions with the blockchain may be "typed" such that different transactions correspond to different transaction types.

According to another embodiment of method 700, the data record is stored on the blockchain within an asset's payload portion via a CREATE asset command term for the blockchain; and in which the data record is associated with a transaction type for stored data records which are to be stored in their entirety with any update within a new block of the blockchain deprecating any prior version of the data record.

According to another embodiment of method 700, the data record is stored on the blockchain within an asset's payload portion via a CREATE asset command term for the blockchain; and in which the data record is associated with a transaction type for stored data records which are to be stored incrementally; in which any update to the stored data record writes the updated values specified by the transaction to a new block on the blockchain with a reference to a prior block on the blockchain within which the stored data record was previously stored; and in which retrieval of the stored data record from the blockchain requires retrieval of the updated values from the new block on the blockchain and retrieval of any remaining values not modified by the updated values from the prior block on the blockchain.

For example, storing records on the blockchain may leverage the CREATE asset command term to transact new assets onto the blockchain, within which the stored data record is then encoded or embodied, for instance, within a payload portion of the new asset. Subsequent updates to the stored data record may then update the asset using the UPDATE asset command function or generate an entirely new asset for a complete record with updated information generated via the data merge operation discussed above, in which case either the UPDATE asset command function may be utilized in which case the new version is created in its entirety but with a reference to a prior deprecated version of the stored data record or the CREATE asset command term may be utilized to simply remove all reference to any prior version and write the complete updated record to the blockchain as a new asset, depending on the blockchain protocol and the considerations of the application developer.

According to another embodiment, method 700 further includes receiving a second transaction for the blockchain requesting the host organization to store a related entity, the related entity to be persistently stored to the blockchain via a second asset separate and distinct from a first asset within which the stored data record is persistently stored on the blockchain; transacting with the blockchain via a CREATE asset transaction to add the second asset to the blockchain and storing the related entity within a payload portion of the second asset; and relating the related entity stored within the second asset to the stored data record within the first asset via a universally unique identifier (UUID) assigned to the related entity.

According to another embodiment, method 700 further includes retrieving the stored data record from the blockchain; updating the stored data record to include the UUID assigned to the related entity; and writing the updated stored data record having the UUID included therein to the blockchain.

According to another embodiment of method 700, the stored data record includes a student record having embedded therein via the plurality of data elements at least a student first name, a student last name, and a student ID; in which the related entity includes a student transcript; relating the related entity stored within the second asset to the stored data record within the first asset via a universally unique identifier (UUID) assigned to the related entity includes linking the student transcript with the student record via the UUID assigned to the student transcript; in which updating the stored data record to include the UUID includes updating the student record to include the UUID linking the student record with the student transcript; and in which writing the updated stored data record having the UUID included therein to the blockchain includes writing the student record to the blockchain having embedded therein the student first name, the student last name, the student ID and the UUID assigned to the student transcript stored on the blockchain via a separate and distinct second asset.

For example, storage of other information which is not part of one of the data elements of the stored data record may nevertheless be stored onto the blockchain via the related entity functionality in which the related entity (such as a student transcript or a student medical record, etc.) is written to the blockchain as metadata stored within a separate asset from the stored data record and then linked with the stored data record by including a UUID assigned automatically to the related entity in the plurality of data elements of the stored data record, thus requiring an update to the stored data record to effectuate the link.

According to another embodiment of method 700, metadata defining a valid format for the data record is stored on the blockchain within an asset's payload portion via a CREATE asset command term for the blockchain; and in which the metadata is associated with a transaction type for stored metadata.

For example, storage of metadata may also leverage the CREATE asset command term, although it is different in terms of its transaction type and also stored contents.

According to another embodiment of method 700, the added transaction is subjected to a consensus protocol by the participating nodes of the blockchain prior to the added transaction being accepted as part of a primary chain of the blockchain by the participating nodes of the blockchain.

For example, transacting on the blockchain retains consensus schemes required for that blockchain so as to ensure transaction validity.

According to another embodiment of method 700, the metadata is accessible only to one of the plurality of tenants of the host organization having defined and transacted the metadata onto the blockchain; or in which alternatively the metadata is accessible all of the plurality of tenants operating as one of the participating nodes with access to the blockchain regardless of which one of the plurality of tenants defined and transacted the metadata onto the blockchain.

For example, it is possible to define and store metadata to the blockchain with the intention that it remain domain-specific to the particular tenant organization that created the metadata for their specific application. However, there may be instances in which an administrator for the host organization wishes to create non-domain-specific metadata which is then made accessible to any tenant organization operating as a participating node within the blockchain or in certain instances, a tenant organization may wish to create such metadata for a particular application which is then made accessible to other tenant organizations.

According to another embodiment of method 700, modification of the metadata transacted onto the blockchain is under the exclusive control of the one of the plurality of tenants having transacted the metadata onto the blockchain for persistent storage via the blockchain; in which a new consensus is required to write changes to the metadata onto the blockchain when the metadata is accessible to any of the plurality of tenants operating as one of the participating nodes with access to the blockchain; and in which no consensus is required to write changes to the metadata onto the blockchain when the metadata is accessible for exclusive use by only the one of the one of the plurality of tenants having originally transacted the metadata onto the blockchain.

For example, where the metadata is accessible to other tenant organizations, then modifications are subjected to consensus controls, however, if the metadata is domain specific and limited to the exclusive use by the tenant organization having created it and stored it on the blockchain originally, then it is not necessary to enforce consensus of such modifications, though optionally, the blockchain protocol may require the consensus operation regardless.

According to another embodiment of method 700, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

For example, certain blockchains are implemented by the host organization itself, in which the host organization defines the blockchain protocol and facilitates access to the blockchain on behalf of its tenant organizations who then operate as participating nodes on the host org provided blockchain, optionally with non-tenant orgs also permitted as participating nodes at the discretion of the host organization. However, there are also existing blockchain implementations which are not defined by or implemented by the host organization and thus, operate external from the host organization with such blockchain protocols having been defined by a third party or an outside consortium or standards body. In such an event, the host organization may nevertheless facilitate access to the blockchain by operating as a participating node itself on the blockchain, via which the host organization may then have access to the functions of the blockchain. In such an event, permissions and access rights may be granted by the tenant orgs to the host organization to act on their behalf as a proxy, or the host organization may implement virtual participating nodes on the blockchain within which each tenant org may operate as a participating node, thus providing a 1:1 correspondence between the tenant orgs and the virtual nodes implemented by the host organization or the host organization may update transactions for the blockchain, but then permit the tenant organization's own participating node to self-authenticate with and then actually transact with the blockchain, for instance, via the host organization provided API. In such a way, tenant orgs may add transactions to the blockchain (subject to consensus) regardless of which the blockchain is implemented by the host organization or a third party.

At block 715 an event is triggered by processing logic that implements the blockchain services interface 190 or blockchain storage manager 194. The event that is triggered can be determined by transaction type in some embodiments.

At block 720, the event is detected by the update interface 185, which handles the event by determining whether the database system 130 includes a correlated set of records that are to be updated to reflect the updated data records stored into the blockchain. If correlated records already exist, then at block 730, matching records in the database system 130 can be determined and retrieved by a transaction type, UUID, or similar information. If matching records are found, the matching records are updated according to the received transaction information, at block 750. If matching records are not found, then, at block 740, new records and/or tables are generated to store the information from the received transaction.

Figure 5A:
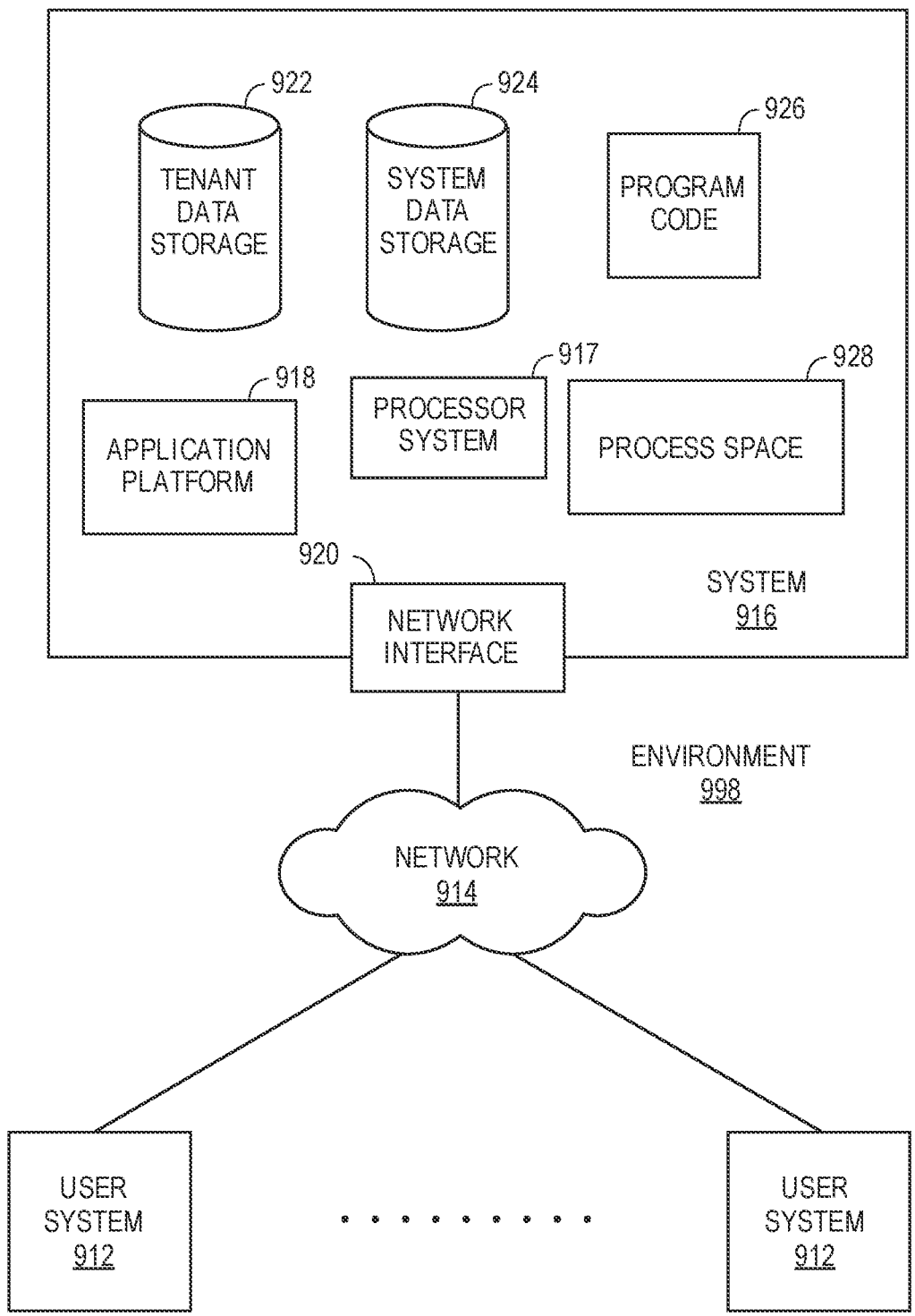
FIG. 5A illustrates a block diagram of an environment in which an on-demand database service may operate in accordance with the described embodiments.

FIG. 5A is a block diagram of an environment 998 in which an on-demand database service may operate in accordance with the described embodiments. Environment 998 may include user systems 912, network 914, system 916, processor system 917, application platform 918, network interface 920, tenant data storage 922, system data storage 924, program code 926, and process space 928. In other embodiments, environment 998 may not have all of the components listed and/or may have other elements instead of, or in addition to, those listed above.

Environment 998 is an environment in which an on-demand database service exists. User system 912 may be any machine or system that is used by a user to access a database user system. For example, any of user systems 912 may be a handheld computing device, a mobile phone, a laptop computer, a work station, and/or a network of computing devices. As illustrated in FIG. 5A (and in more detail in FIG. 5B) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" is used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 5A, implements a web-based Customer Relationship Management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 5A, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database updating processes.

Several elements in the system shown in FIG. 5A include conventional, well-known elements that are explained only briefly here. For example, each user system 912 may include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device may be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 5B:
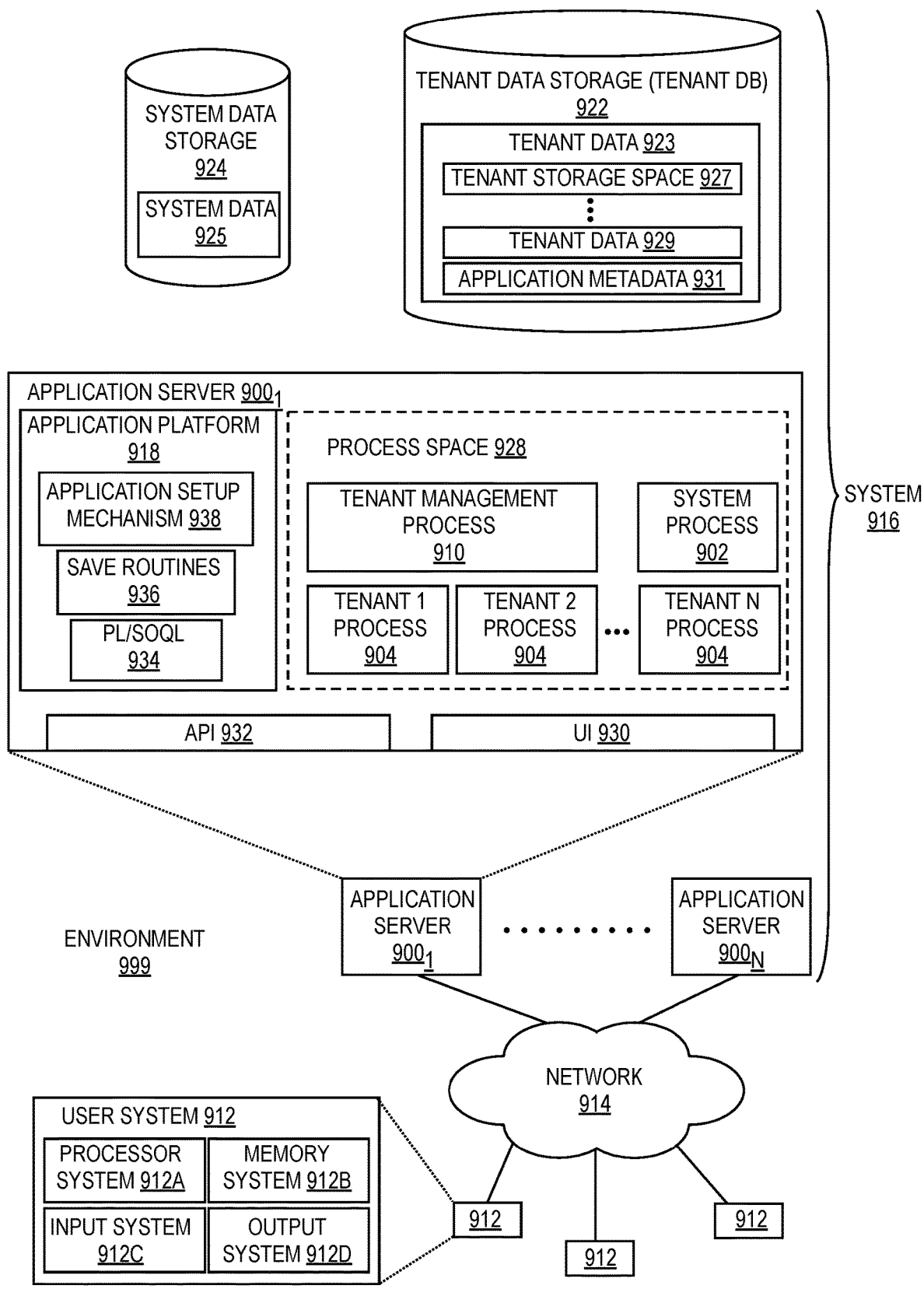
FIG. 5B illustrates another block diagram of an embodiment of elements of FIG. 5A and various possible interconnections between such elements in accordance with the described embodiments.

FIG. 5B is a diagram that illustrates another embodiment of elements of FIG. 5A and various possible interconnections between such elements in accordance with the described embodiments. FIG. 5B also illustrates environment 999. However, in FIG. 5B, the elements of system 916 and various interconnections in an embodiment are illustrated in further detail. More particularly, FIG. 5B shows that user system 912 may include a processor system 912A, memory system 912B, input system 912C, and output system 912D. FIG. 5B shows network 914 and system 916. FIG. 5B also shows that system 916 may include tenant data storage 922, having therein tenant data 923, which includes, for example, tenant storage space 927, tenant data 929, and application metadata 931. System data storage 924 is depicted as having therein system data 925. Further depicted within the expanded detail of application servers 900$_{1-N}$ are User Interface (UI) 930, Application Program Interface (API) 932, application platform 918 includes PL/SOQL 934, save routines 936, application setup mechanism 938, process space 928 includes system process space 902, tenant 1-N process spaces 904, and tenant management process space 910. In other embodiments, environment 999 may not have the same elements as those listed above and/or may have other elements instead of, or in addition to, those listed above.

User system 912, network 914, system 916, tenant data storage 922, and system data storage 924 were discussed above in FIG. 5A. As shown by FIG. 5B, system 916 may include a network interface 920 (of FIG. 5A) implemented as a set of HTTP application servers 900, an application platform 918, tenant data storage 922, and system data storage 924. Also shown is system process space 902, including individual tenant process spaces 904 and a tenant management process space 910. Each application server 900 may be configured to tenant data storage 922 and the tenant data 923 therein, and system data storage 924 and the system data 925 therein to serve requests of user systems 912. The tenant data 923 might be divided into individual tenant storage areas (e.g., tenant storage space 927), which may be either a physical arrangement and/or a logical arrangement of data. Within each tenant storage space 927, tenant data 929, and application metadata 931 might be similarly allocated for each user. For example, a copy of a user's most recently used (MRU) items might be stored to tenant data 929. Similarly, a copy of MRU items for an entire organization that is a tenant might be stored to tenant storage space 927. A UI 730 provides a user interface and an API 932 provides an application programmer interface into system 916 resident processes to users and/or developers at user systems 912. The tenant data and the system data may be stored in various databases, such as one or more Oracle™ databases.

Application platform 918 includes an application setup mechanism 938 that supports application developers' creation and management of applications, which may be saved as metadata into tenant data storage 922 by save routines 936 for execution by subscribers as one or more tenant process spaces 904 managed by tenant management process space 910 for example. Invocations to such applications may be coded using PL/SOQL 934 that provides a programming language style interface extension to API 932. Invocations to applications may be detected by one or more system processes, which manages retrieving application metadata 931 for the subscriber making the invocation and executing the metadata as an application in a virtual machine.

Each application server 900 may be communicably coupled to database systems, e.g., having access to system data 925 and tenant data 923, via a different network connection. For example, one application server 900$_1$ might be coupled via the network 914 (e.g., the Internet), another application server 900N-1 might be coupled via a direct network link, and another application server 900N might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 912 to distribute requests to the application servers 900. In one embodiment, the load balancer uses a least connections algorithm to route user requests to the application servers 900. Other examples of load balancing algorithms, such as round robin and observed response time, also may be used. For example, in certain embodiments, three consecutive requests from the same user may hit three different application servers 900, and three requests from different users may hit the same application server 900. In this manner, system 916 is multi-tenant, in which system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 900 to request and update system-level and tenant-level data from system 916 that may require sending one or more queries to tenant data storage 922 and/or system data storage 924. System 916 (e.g., an application server 900 in system 916) automatically generates one or more SQL statements (e.g., one or more SQL queries) that are designed to access the desired information. System data storage 924 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6:
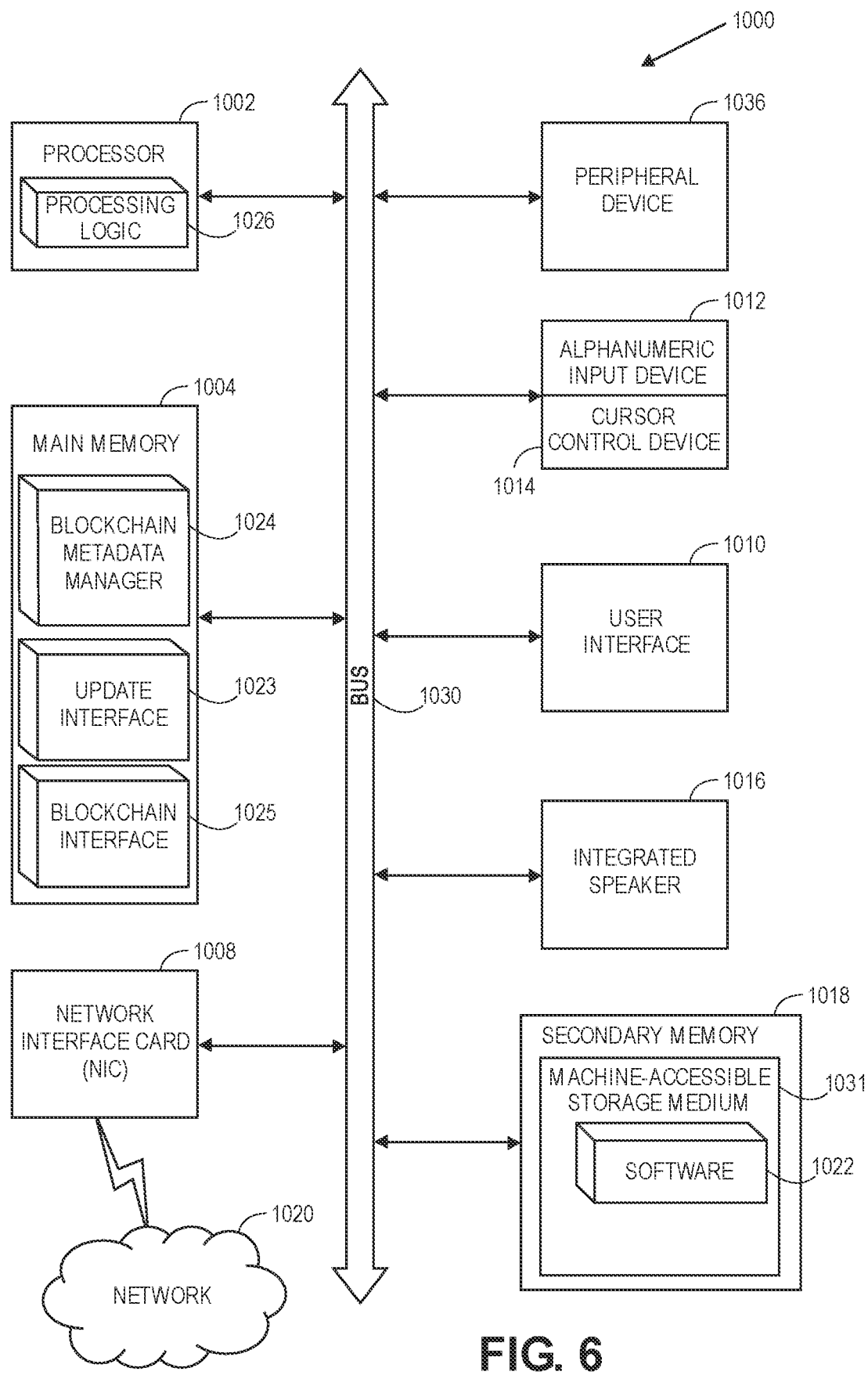
FIG. 6 illustrates a diagrammatic representation of a machine to execute an update interface in the example form of a computer system, in accordance with one embodiment.

FIG. 6 is a block diagram of a machine 1000 for implementing the update interface 185 in the example form of a computer system, in accordance with one embodiment, within which a set of instructions, for causing the machine/computer system 1000 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and a persistent database and/or a multi-tenant database implementation), which communicate with each other via a bus 1030. Main memory 1004 includes a blockchain storage manager 1024 and an update interface 1023 and a blockchain interface 1025. Main memory 1004 and its sub-elements are operable in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality which is discussed herein.

The computer system 1000 may further include a network interface card 1008. The computer system 1000 also may include a user interface 1010 (such as a video display unit, a liquid crystal display, etc.), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the preceding description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the example implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is by way of example (e.g., alternative implementations may perform the operations in a different order, combine certain operations, overlap certain operations, etc.).

While the above description includes several example implementations, those skilled in the art will recognize that the invention is not limited to the implementations described and can be practiced with modification and alteration within the spirit and scope of the appended claims. The description is thus illustrative instead of limiting.

What is claimed is:

1. A method implemented by a computer system comprising:
   receiving a transaction for a blockchain to update a data record persistently stored on the blockchain as a plurality of blocks, the transaction specifying updated values for one or more of a plurality of data elements of the data record;
   identifying correlated data records in a database system related to the data record using a first universally unique identifier (UUID) associated with the data record, the database system separate from the blockchain and supporting structured query language searches of the correlated data records;
   updating one or more of the correlated data records in the database system separate from the blockchain to match the updated values for the data record in the blockchain, the database system supporting structured query language searches of the correlated data records;
   generating a second UUID to identify an entity related to the data record in the blockchain;
   storing, in the database system and blockchain, a new record linking the second UUID to the first UUID thereby creating an association between the data record and the entity related to the data record;
   updating the correlated data records and the data record in the blockchain to include the second UUID; and
   writing the entity as metadata to a new block in the blockchain.

2. The method of claim 1, wherein the updating one or more of the correlated data records is triggered by an event generated by consensus to approve the transaction to update the data record in the blockchain.

3. The method of claim 1, further comprising:
   identifying the correlated data records using a transaction type.

4. The method of claim 1, wherein the second UUID is assigned to the entity.

5. The method of claim 1, further comprising:
   generating new correlated data records as a result of finding no existing correlated data records.

6. The method of claim 1, wherein the data elements to be updated include metadata for the data record, where the metadata is updated into corresponding tables in the data records in the database system, where the metadata defines a format of the data record stored on the blockchain.

7. The method of claim 6,
   wherein an update interface updates the metadata in the blockchain and in the database system to update the format of the data record in response to the transaction.

8. A non-transitory computer readable storage medium having instructions stored thereon that, when executed by a computer system, the instructions cause the computer system to perform the following operations:
   receiving a transaction for a blockchain to update a data record persistently stored on the blockchain as a plurality of blocks, the transaction specifying updated values for one or more of a plurality of data elements of the data record;
   identifying correlated data records in a database system related to the data record using a first universally unique identifier (UUID) associated with the data record, the database system separate from the blockchain and supporting structured query language searches of the correlated data records;
   updating one or more of the correlated data records in the database system separate from the blockchain to match the updated values for the data record in the blockchain, the database system supporting structured query language searches of the correlated data records;
   generating a second UUID to identify an entity related to the data record in the blockchain;
   storing, in the database system and blockchain, a new record linking the second UUID to the first UUID thereby creating an association between the data record and the entity related to the data record;
   updating the correlated data records and the data record in the blockchain to include the second UUID to identify a; and
   writing the entity as metadata to a new block in the blockchain.

9. The non-transitory computer readable storage medium of claim 8, wherein the updating one or more of the correlated data records is triggered by an event generated by consensus to approve the transaction to update the data record in the blockchain.

10. The non-transitory computer readable storage medium of claim 8, having further instructions stored thereon that cause the computer system to perform further operations comprising:
    identifying the correlated data records using a transaction type.

11. The non-transitory computer readable storage medium of claim 8, wherein the second UUID is assigned to the entity.

12. The non-transitory computer readable storage medium of claim 8, having further instructions stored thereon that cause the computer system to perform further operations comprising:
    generating new correlated data records as a result of finding no existing correlated data records.

13. The non-transitory computer readable medium of claim 8, wherein the data elements to be updated include metadata for the data record, where the metadata is updated into corresponding tables in the data records in the database system, where the metadata defines a format of the data record stored on the blockchain.

14. The non-transitory computer readable medium of claim 13, wherein an update interface updates the metadata in the blockchain and in the database system to update the format of the data record in response to the transaction.

15. A computer system comprising:
    a non-transitory computer readable medium to store instructions including an update interface; and
    a processor, coupled to the non-transitory computer readable medium, to execute the update interface, the update interface configurable to cause the processor to:
        receive a transaction for a blockchain to update a data record persistently stored on the blockchain as a plurality of blocks, the transaction specifying updated values for one or more of a plurality of data elements of the data record, identify correlated data records in a database system related to the data record using a first universally unique identifier (UUID) associated with the data record, the database system separate from the blockchain and supporting structured query language searches of the correlated data records, update one or more of the correlated data records in the database system to match the updated values for the data record in the block chain, generate a second UUID to identify an entity related to the data record in the blockchain;

store, in the database system and blockchain, a new record linking the second UUID to the first UUID thereby creating an association between the data record and the entity related to the data record;

update the correlated data records and the data record in the blockchain to include the second UUID, and write the entity as metadata to a new block in the blockchain.

16. The computer system of claim 15, wherein the update one or more of the correlated data records is triggered by an event generated by consensus to approve the transaction to update the data record in the blockchain.

17. The computer system of claim 15, wherein the update interface is further configurable to cause the processor to identify the correlated data records using a transaction type.

18. The computer system of claim 15, wherein the second UUID is assigned to the entity.

19. The computer system of claim 15, wherein the update interface is further configurable to cause the processor to generate new correlated data records as a result of finding no existing correlated data records.

20. The computer system of claim 15, wherein the data elements to be updated include metadata for the data record, where the metadata is updated into corresponding tables in the data records in the database system, where the metadata defines a format of the data record stored on the blockchain,
wherein an update interface updates the metadata in the blockchain and in the database system to update the format of the data record in response to the transaction.

* * * * *